United States Patent [19]

Brotz

[11] 3,891,970

[45] June 24, 1975

[54] TEN BUTTON SELECTION SYSTEM FOR AUTOMATIC PHONOGRAPH

[75] Inventor: William C. Brotz, Wyoming, Mich.

[73] Assignee: Rowe International, Inc., Whippany, N.Y.

[22] Filed: Apr. 26, 1974

[21] Appl. No.: 464,575

[52] U.S. Cl. .......... 340/162

[51] Int. Cl. .......... G11b 19/08

[58] Field of Search .......... 340/162; 194/15

[56] References Cited

UNITED STATES PATENTS 3,701,970 10/1972 Jachimek .......... 340/162

*Primary Examiner*—Harold I. Pitts

*Attorney, Agent, or Firm*—Shenier & O'Connor

[57] ABSTRACT

A ten button selector system for an automatic phonograph in which in response to sequential operation of three buttons of a ten button selector switch assembly, there is first generated a binary coded decimal representation of the selected number, which representation first is employed to illuminate the segments of a three digit display to indicate the selection made and then the representation is transmitted to the central storage unit of the phonograph system in the form of a train of pulses incorporating the representation together with a train of clock pulses and which system is adapted to receive from the storage system a train of pulses incorporating the binary coded decimal representation of a selection being played together with a train of clock pulses, which received pulses illuminate the display segments to show the selection being played, so long as a selection is not being made by the user. Means are provided for inhibiting operation of the system whenever the number generated is not within a predetermined range of allowable choices, whenever a spurious digit is generated by simultaneously pressing two or more buttons, and whenever the second digit indicates that a premium selection has been made and premium credit is not available. Means are also provided for generating a credit cancelling signal which is fed to the credit accumulator of the phonograph.

36 Claims, 11 Drawing Figures

TEN BUTTON SELECTION SYSTEM FOR AUTOMATIC PHONOGRAPH

BACKGROUND OF THE INVENTION

There are known in the prior art automatic phonograph selection systems in which a plurality of lettered and numbered buttons are employed. Usually there are 22 lettered and 10 numbered buttons. The lettered buttons indicate whether or not the selection is a right or left selection in the storage system, while a two digit number resulting from sequential operation of two of the numbered buttons indicates which selection in the particular left or right magazine has been chosen. In response to actuation of the buttons, electromechanical devices are operated to cause the storage unit of the phonograph to select the proper record. No provision is made for visually indicating the selection which has been made.

There has recently been disclosed, in Jachimek et al U.S. Pat. No. 3,701,970, a phonograph selection system wherein any of the electromechanical devices have been replaced by logic circuits. In the preferred embodiment shown in the patent, instead of a plurality of switches corresponding to respective letters and numbers, a ten button switch assembly is actuated sequentially to generate data signals representing respective first, second, and third digits of a selection-identifying number. These signals are temporarily stored in a first register for error-checking purposes, and, when signals representing all three digits have been entered into the first register, are transmitted to a second register located in the central unit. The second register is used to address a memory unit for writing in a selection control signal. The data signals representing the digits consist of 4-bit binary coded signals. The first and second registers each consist of four three-stage shift registers having a common clock line. Respective bits of a digit signal are simultaneously pulsed into the respective first stages of the shift registers when generated, and are shifted through the stages on succeeding pulses. When all three digits have been loaded and error checked, the data in the first register is shifted out and transmitted to the second register, the contents of each shift register being sent over a separate channel. This data is entered into the second register in the same manner as the first, and is there used to make the appropriate entry into the memory.

While the Jachimek patent discloses means for indicating whether first or second digits have been loaded into the first register, no means are provided for indicating the identity of such digits, leaving open the possibility that an erroneous selection will be made. Nor are any means provided for indicating the record currently being played. Such means would be desirable in the frequently occurring situation where a potential customer cannot associate the sound of the selection played with its number. However, to construct a two-way system on the principle of the Jachimek apparatus would require eight transmission lines, thereby creating the very multiplicity of lines that the patentee seeks to avoid.

I have invented a selector system for an automatic phonograph which overcomes the above-described defects of prior art selector systems. My system visually displays the number of the selection being chosen, or, alternatively, the number of the selection being played.

Selection information is transmitted from the selector to the central storage unit as a train of data pulses over a single line, while clock pulses are transmitted over a second line. The same two lines are used to receive clock pulses and timing pulses, respectively, from the central unit. Two-way communication is thereby established by using only two lines instead of the eight which would be required by a system such as that disclosed by the Jachimek patent requiring four lines for each direction of communication.

SUMMARY OF THE INVENTION

One object of my invention is to provide a ten button selector for an automatic phonograph which overcomes the defects of selection systems of the prior art.

Another object of my invention is to provide a ten button selector for an automatic phonograph which requires only ten push buttons for proper operation thereof.

A further object of my invention is to provide a ten button selector for an automatic phonograph which does not require the multiplicity of electromechanical devices employed in systems of the prior art.

Still another object of my invention is to provide a ten button selector for an automatic phonograph which visually displays the number of a selection as it is made and of a selection as it is played.

A further object of my invention is to provide a 10 button selector for an automatic phonograph which does not require a multiplicity of transmission lines.

A still further object of my invention is to provide a 10 button selector for an automatic phonograph which is simple and certain in operation.

Yet another object of my invention is to provide a ten button selector for an automatic phonograph which is compact.

Other and further objects will appear from the following description.

In general, my invention contemplates a selector unit to be used in an automatic phonograph system, which system includes a central storage unit to perform the appropriate storage, search, and playing functions. The storage unit used herein is described at length in the copending application of Gerard J. Oosterhouse, Ser. No. 526,098, filed Nov. 22, 1974. When the selector is in its normal, or "playing" mode, data signals consisting of ten-bit pulse trains and representing the number of the record being played are periodically transmitted along with a clocking signal from the storage unit, loaded into the selector shift register, error checked, and applied to the selector display. A latch, which couples the register output to the display circuit, holds out the last received data signal unit the shift register is loaded with the next, at which time the latch is updated. In the preferred embodiment, the data displayed consists of a three-digit number ranging from 100 to 299. The 10-bit data signal transmitted by the storage unit consists of a first digit parity bit, a first digit data bit, a four-bit second digit signal, and a four-bit third digit signal.

A set of 10 selector buttons on the selector unit are used to generate the selection numeral of a record to be played. This number must also lie between 100 and 299 for the particular embodiment shown. Manual actuation of any of these buttons inhibits the transmitted data signal from the shift register and places the selector in a "selecting" mode, provided that a minimum operating credit is available. In this mode, sequential actuation of three buttons to select a three digit number causes binary encoded digit signals to be loaded into the respective portions of the shift register and applied to the display circuit. Means are provided for disabling the second and third digit portions of the display until those digits are loaded into the shift register. Means are provided for restarting the loading cycle whenever the number loaded is not within a predetermined range, whenever a spurious digit is loaded by simultaneous actuation of two or more buttons, or whenever a premium level of operating credit is required, but is not available. Means are also provided for generating a credit-cancelling signal which is fed to the credit accumulator of the phonograph. When all of the digits have been loaded, the shift register contents are "latched" onto by the display latch and then serially transmitted as a single ten-bit pulse train to the storage unit, along with a clocking signal. Like the data signal transmitted from the storage unit, this transmitted data signal also has one parity bit and nine data bits. The latched data is displayed for a predetermined time after its transmission from the shift register to the storage unit. Following the display period, the display is blanked for a brief interval, after which the system returns to the "selecting" mode.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figure 1A:
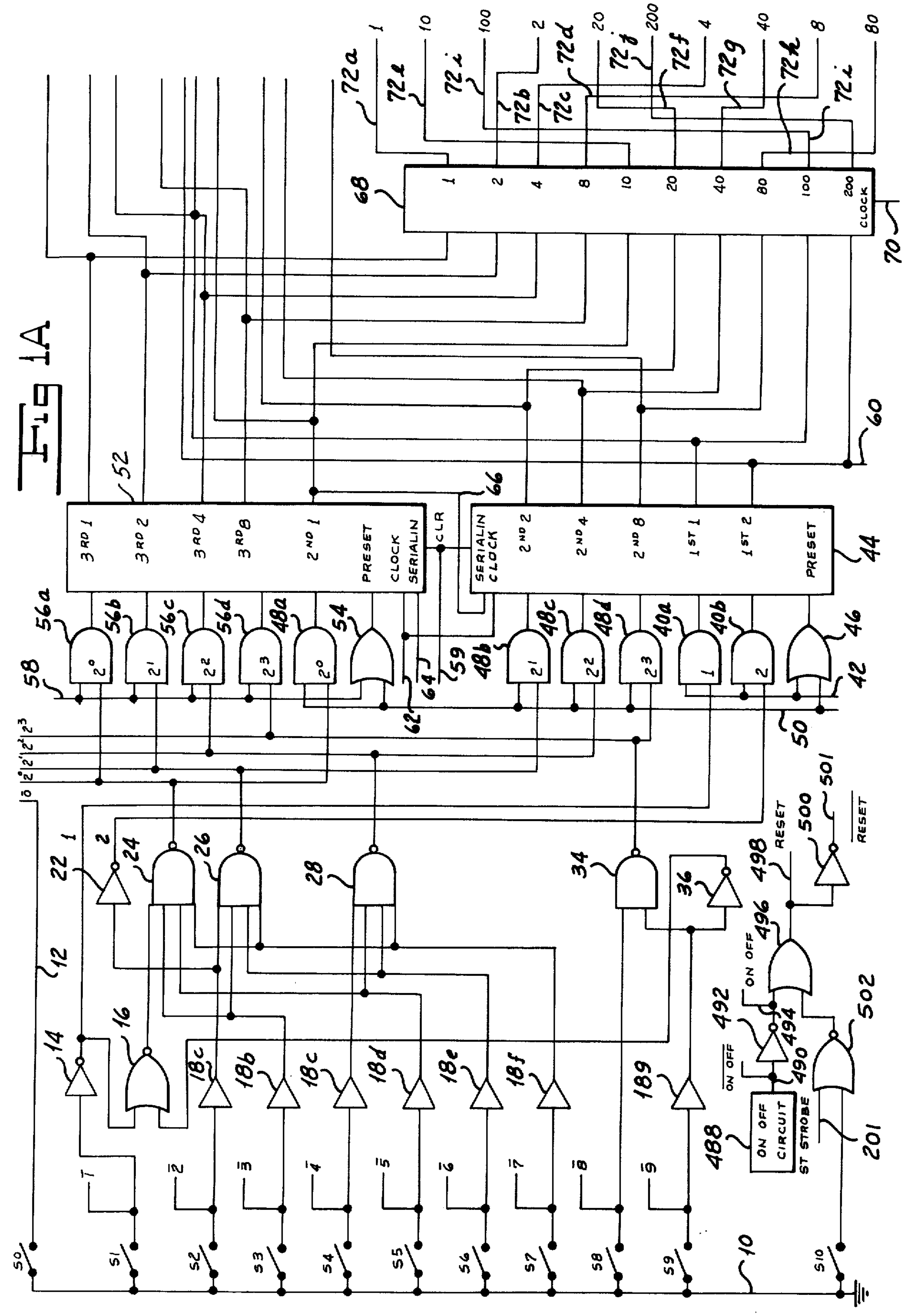
FIG. 1A is a schematic view of the selection switch and storage register portion of my ten button selector for an automatic phonograph.
Figure 1B:
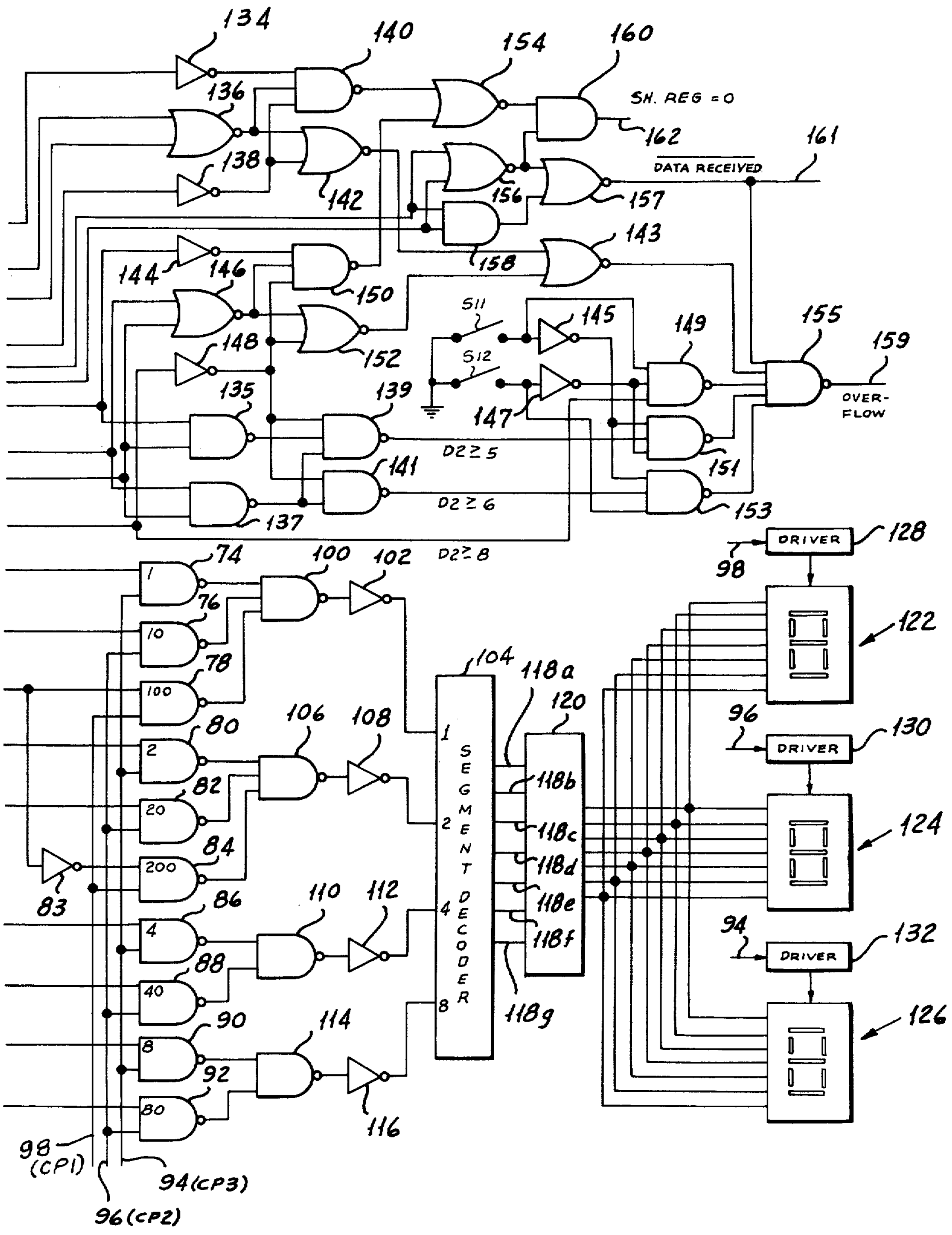
FIG. 1B is a schematic view of the decoding and visible display portion of my ten button selector for an automatic phonograph.

Referring now to FIGS. 1A and 1B of the drawings, my system includes a plurality of normally open switches S0 to S10 of a push button keyboard or the like, the switches S0 to S9 corresponding respectively to 0 and to the digits 1 to 9 and the switch S10 being a reset switch. One terminal of each of the switches S0 to S10 is connected to a ground line 10. When switch S0 closes, it grounds a line 12. Closing of switch S1 grounds a "$\bar{1}$" line, and also grounds the input to an inverter 14 to produce a signal on a 1 line. This signal is applied to one input terminal of a two-input NOR circuit 16. Closing of the respective switches S2 to S7 and S9 grounds a $\bar{2}$ to $\bar{7}$ line and a $\bar{9}$ line, respectively, and also grounds the input terminals of respective amplifiers 18*a* through 18*g* to cause the amplifiers to provide outputs at ground. Closing of switch S8 grounds an $\bar{8}$ line. An inverter 22 connected to the output of amplifier 18*a* produces a signal at its output when switch S2 is closed indicating that the digit 2 has been selected. A four input NAND circuit 24 receives inputs from NOR circuit 16 and from amplifiers 18*b*, 18*d* and 18*f* to produce an output on a $2^0$ line when any of the switches S1, S3, S5, S7 or S9 closes. A four-input NAND circuit 26 receives its inputs from amplifiers 18*a*, 18*b*, 18*e* and 18*f* to produce an output on a $2^1$ line when any of the switches S2, S3, S6 or S7 closes. A four-input NAND circuit 28 receives inputs respectively from amplifiers 18*c*, 18*d*, 18*e* and 18*f* to produce an output on a $2^2$ line whenever any of the switches S4 to S7 is closed. A two-input NAND circuit 34 which receives its inputs from the 8 line and from amplifier 18*g*, provides an output signal on a $2^3$ line whenever either of the switches S8 or S9 closes. An inverter 36 connected to the output of amplifier 18*g* produces an output when switch S9 closes. Inverter 36 provides the other input for NOR circuit 16.

In my system, the first digit of any three-digit number selected must be either a 1 or a 2, signalling that either the left hand bank or the right hand bank of records is being selected. I apply the outputs of inverters 14 and 22 corresponding to the 1 and 2 lines respectively to one input terminal of two input AND circuits 40*a* and 40*b*. A line 42 connected to the other input terminals of the AND circuits 40*a* and 40*b* receives a "load first digit" signal in a manner to be described to cause the first digit to be loaded into a shift register section 44. A two-input OR circuit 46 receives one of its inputs from line 42 and applies the signal to a preset terminal of the register section 44. The bit loaded by AND circuit 40*a* is the first digit data bit. The bit which is loaded by AND circuit 40*b* is redundant, and is used for parity-checking purposes to be described below.

When the system is operating at a 200 record selection capacity, the second digit of the three-digit number inserted into my system may be any one of the digits from 0 to 9. I connect the outputs of NAND circuits 24, 26, 28 and 34 corresponding to $2^0$, $2^1$, $2^2$, $2^3$ to respective first input terminals of two-input AND circuits 48*a* to 48*d*. The other input to the AND circuits 48*a* to 48*d* is supplied by a "load second" digit signal on a line 50. The signal on line 50 is applied to the second input terminal of OR circuit 46 and to one terminal of an OR circuit 54 connected to the preset input of a second register section 52. Register sections 44 and 52, when referred to as a unit, shall be referred to as the shift register 44–52. I also apply the outputs of the respective NAND circuits 24, 26, 28 and 34 to respective first input terminals of two-input AND circuits 56*a* to 56*d* the other inputs to which are supplied by a "load third digit" signal on a line 58. The signal on line 58 is also applied to the second input terminal of OR circuit 54. A line 59 is adapted to apply a "clear shift register" signal to the registers 44 and 52 in a manner to be described. Information contained in the register sections 44 and 52 is adapted to be fed serially out of the register sections on a line 60 in response to clock pulses supplied to a line 62. Similarly, in a manner to be described more fully hereinbelow, information can be serially fed into the register sections on a line 64 in response to clock pulses on a "shift register clock" line 62. To facilitate this operation, a conductor 66 connects the lowermost output terminal of register section 52 to the serial input terminal of the register section 44.

From the structure thus far described, it will be appreciated that after a three-digit number has been selected and has been loaded into register sections 44 and 52, the lowermost two output places of register section 44 contain the parity bit and the first-digit data bit, respectively. The upper three outputs of register section 44 together with the lowermost output of register section 52 contain the second digit in binary form. The four uppermost outputs of register section 52 contain the third digit in binary form. Thus, the register sections 44 and 52 provide a binary coded decimal representation of the three digit number selected. I apply all of the data bit outputs of the registers 44 and 52 to a 10-bit latch adapted to receive an input clock from a "latch clock" line 70. The latch 68 is adapted to produce outputs on conductors 72*a* to 72*j* corresponding respectively to the numbers 1, 2, 4, 8, 10, 20, 40, 80, 100, 200.

I provide means for displaying the three-digit number in response to the outputs of the latch 68. I apply the outputs on conductors 72*a*, 72*e* and 72*i* respectively, corresponding to 1, 10 and 100 to one input of each of a plurality of two-input NOR circuits 74, 76 and 78. Line 72*i* also is applied to one input of NAND circuit 84 via an inverter 83. I apply the outputs on conductors 72*b* and 72*f* corresponding respectively to 2 and 20, to respective input terminals of two-input NAND circuits 80 and 82. I connect output lines 72*c* and 72*g* respectively to first input terminals of a pair of two-input NAND circuits 86 and 88. Similarly, I apply the outputs on lines 72*d* and 72*h* which correspond respectively to 8 and 80 to respective first input terminals of a pair of two input NAND circuits 90 and 92.

A conductor 98 carrying a first digit read signal "CP1" provides the other input for each of the NAND circuits 78 and 84. A conductor 94 carrying a third digit read signal "CP3" provides the second input for each of the NAND circuits 74, 80, 86 and 90. A conductor 96 carrying a second digit read signal "CP2" provides the other input for each of the NAND circuits 76, 82, 88 and 92. A three-input NAND circuit 100 receives inputs from circuits 74, 76 and 78 to provide an output which is coupled by inverter 102 to the units place input terminal of a seven-segment decoder 104. A second three-input NAND circuit 106 receiving inputs from circuits 80, 82 and 84 provides the input for an inverter 108 which supplies the input to the 2's place terminal of the decoder 104. A two-input NAND circuit 110 receives its inputs from NAND circuits 86 and 88 to provide an input for an inverter 112 which supplies the 4's place terminal of decoder 104. A two input NAND circuit 114 receives its inputs from circuits 90 and 92 tto provide an input for an inverter 116 which supplies the 8's place input for the decoder 104.

In response to inputs at its input terminals, decoder 104 provides outputs on seven respective conductors 118*a* to 118*g* which outputs can be employed to drive the segments of a suitable display device to provide an indication of the digit represented by the inputs to decoder 104. These signals appearing on conductors 118*a* to 118*g* are coupled by a segment driver circuit 120 to the segments of three respective display units indicated generally by the reference characters 122, 124 and 126. These display devices may be of any suitable type known to the art. Each is comprised of seven segments adapted to be illuminated so as to form any one of the digits from 0 to 9. Respective character drivers 128, 130 and 132 associated with the units 122, 124 and 126 are adapted to be activated to actuate their corresponding unit. That is to say, when the hundreds digit is to be displayed in response to the signal on line 98 decoder 104 first produces an output on those of the conductors 118*a* to 118*g* which represent either 1 or 2. At the same time, the circuit 128 receives the CP1 pulse to activate unit 122 so that in response to the output from circuit 120, this unit is lighted to represent a 1 or a 2. In a similar manner, when the second digit read signal appears on line 96, circuit 130 is actuated by the CP2 pulse to activate unit 124 to cause its segments to light up in such a way as to form the second digit. When the third digit read signal appears on conductor 94, circuit 132 is activated by the CP3 pulse to energize unit 126 to display the third digit of the three-digit number being fed through the system.

I arrange my system to provide signals indicating that the shift register is clear, that the register is loaded with a data signal, or that the number loaded is not within a predetermined selection range. An inverter 134 responsive to the uppermost place in register 52, which is the 1's place of the third digit, a two-input NOR circuit 136 responsive to the 2's and 4's places of the third digit, and an inverter 138 responsive to the 8's place of the third digit provide three inputs for a three-input NOR circuit 140. NOR circuit 136 and inverter 138 also provide the inputs for a two-input NOR circuit 142. An inverter 144 responsive to the 1's place of the second digit, a two-input NOR circuit 146 responsive to the 2's and 4's places of the second digit, and an inverter 148 responsive to the 8's place of the second digit, provide the inputs of a three-input NAND circuit 150. Circuit 146 and inverter 148 also provide the inputs for a two-input NOR circuit 152. A two-input NOR circuit 154 responsive to AND circuits 140 and 150 provides a first input for an AND circuit 160. A two-input NOR circuit 156 responsive to the 1's and 2's places of the first digit provides the second input for AND circuit 160. It will be appreciated that circuit 160 produces an output on line 162 if and only if the content of the registers 44 and 52 is zero.

NOR circuit 156 also provides one input to a NOR circuit 157, the other input to which is provided by AND circuit 158. Like NOR circuit 156, AND circuit 158 is also responsive to the 1's and 2's places of the first digit output of the shift register 44–52. It will be appreciated that circuit 157 produces an 0 output on a "data received" line 161 whenever identical bits — that is, either two 1's or two 0's are stored in the first digit output places of the shift register 44–52. Since the data signal transmitted by the storage unit contains a parity bit identical to the first digit data bit, line 161 is used to signal to the other sections of the selector unit that such data has been properly received.

Means are provided for indicating whether the digits selected from a permissible selection number. NAND circuit 135, driven by the 1's and 2's places of the second digit register output, provides one input to a NAND circuit 139. NAND circuit 137, driven by the 4's and 8's places of the second digit register output, provides one input to NAND circuit 141 and a second input to NAND circuit 139. Inverter 148 provides an additional input both to NAND circuit 139 and to NAND circuit 141. The outputs of circuits 139 and 141 are applied via respective "D2 ≥ 5" and "D2 ≥6" lines, to inputs of NAND circuits 151 and 153 respectively. The 8's place of the second digit register output is connected, via a "D2 ≥ 8" line, to one input of NAND circuit 149. A selection capacity switch S11, one terminal of which is connected to ground, has its ungrounded terminal connected to the input of inverter 145 and to one input of NAND circuit 149. Selection capacity switch S12, one terminal of which is also grounded, has its ungrounded terminal connected to the input of inverter 147 and to one input of NAND circuit 153. Inverter 145 drives additional inputs of NAND circuits 151 and 153, while inverter 147 drives additional inputs of NAND circuits 149 and 151. NAND circuits 149, 151 and 153 drive inputs to NAND circuit 155; additional inputs to circuit 155 are provided by NOR circuit 143, which is responsive to the outputs of NOR circuits 142 and 152, and by NOR circuit 157. NAND circuit 155 produces an output on an "overflow" line 159, which is connected to an error status circuit to be described.

NAND circuit 155 will produce a signal on line 159 whenever "illegal" digits have been generated by the user and loaded into the shift register. Such illegal digits may be generated by the simultaneous actuation of two or more keys, or by actuation of a key which is improper for that particular digit. If, when the first digit is attempted to be loaded into the shift register, both keys S1 and S2 are actuated, the 0 which is thereby generated by circuit 157 will produce an overflow signal on line 159. A similar result will occur if some other key, say key S3, is actuated in selecting a first digit. Thus, in the case of a locally generated data signal, as distinguished from one originating from the storage unit, the parity bit must be the logical complement of the first-digit data bit if there is to be proper operation. If two or more keys are actuated to select a second or third digit and the signal loaded as a result is greater than 10, a 1 is generated by NOR circuit 152 or 142, respectively. An 0 is then generated by NOR circuit 143, again producing a signal on line 159.

Various selection capacities of 200, 160, 120 and 100 phonograph records are effected by limiting the second digit to the ranges 0–9, 0–7, 0–5 and 0–4 respectively. It will be appreciated that signals will be generated on the D2 ≥ 5, D2 ≥ 6, and D2 ≥ 8 lines whenever the second digit register output is equal to or greater than 5, 6 and 8 respectively. Depending on the predetermined setting of selection capacity switches S11 and S12, these range-sensing signals are selectively gated onto the overflow line 159. Thus, with both switch S11 and S12 open, circuits 149, 151 and 153 remain at 1 regardless of the value of the second digit. Therefore, no overflow signal is generated unless the second digit equals or exceeds 10. With switch S11 only closed, the D2 ≥ 8 signal is gated onto the overflow line via NAND circuit 149, limiting the second digit to a value of 7 or under. With switch S12 only closed, the D2 ≥ 6 signal is gated onto the overflow line via NAND circuit 153, limiting the second digit to a value of 5 or under. With both switches S11 and S12 closed, the D2 ≥ 5 signal is gated onto the overflow line via NAND circuit 151, limiting the second digit to a value of four or under. The error-indicating and resetting sequence which is initiated by the overflow signal is described below in connection with the operation of the circuits shown in FIG. 6.

Figure 2:
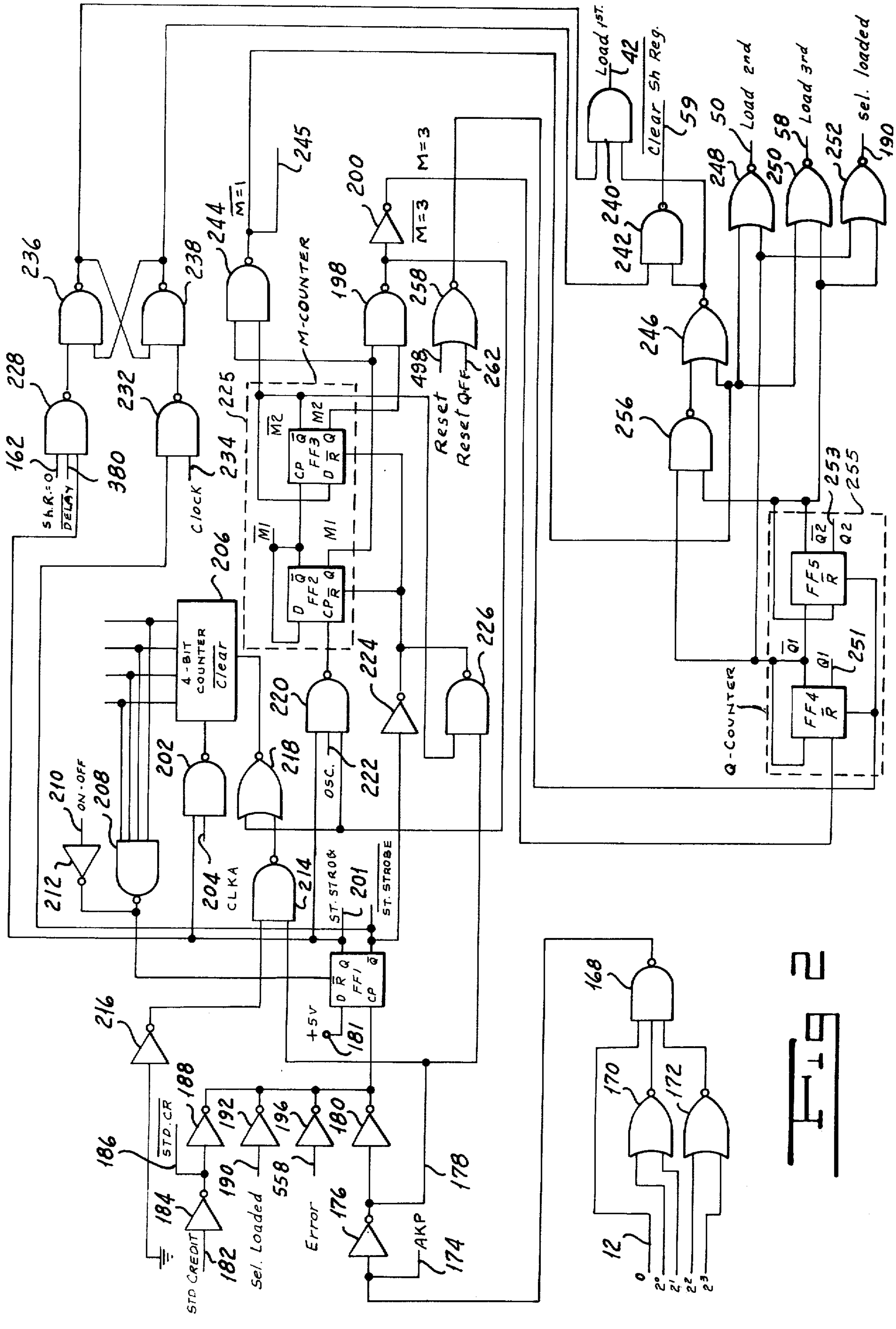
FIG. 2 is a schematic view illustrating the load pulse generating system of my ten button selector for an automatic phonograph.

Referring now to FIG. 2, which illustrates the system for generating the digit loading signals, I connect the $\overline{0}$ line 12 to the one input terminal of a three-input NAND circuit 168. A two-input NOR circuit 170 receives inputs from the $2^0$ and $2^1$ lines leading from NAND circuits 24 and 26 and its output provides the second input for NAND circuit 168. Another two-input NOR circuit 172 responsive to the $2^2$ and $2^3$ lines leading from NAND circuits 28 and 34 provides the third input for NAND circuit 168. It will be appreciated that when any of the switches S0 through S9 is operated, NAND circuit 168 produces a pulse on a line 174 indicating that a switch has been closed. For purposes of convenience I have designated this signal as AKP (a key pushed). An inverter 176 produces a zero output on a line 178 when a key has been pressed. Inverter 180 couples the output of inverter 176 to the CP terminal of a flip-flop FF1 of a group of D type flip-flops FF1 – FF5 included in the digit loading pulse generating circuit. The D terminal of flip-flop FF1 is connected to a suitable source of positive potential 181.

I provide means for inhibiting the operation of the pulse generating circuit under certain conditions. A line 182 adapted to carry a "standard credit" signal, indicating that sufficient operating credit for a standard selection exists, is coupled by an inverter 184 to a "$\overline{\text{standard credit}}$" line 186 indicating the absence of standard credit. Another inverter 188 couples line 186 to the CP terminal of flip-flop FF1. This arrangement ensures that if no standard credit exists flip-flop FF1 cannot be triggered to its on state. Another line 190 carries a "selection loaded" signal which is coupled by an inverter 192 to the CP terminal of FF1 to prevent the flip-flop from being triggered when the selection loaded signal exists. Another line 558 carries an "error" signal coupled to the CP terminal of flip-flop FF1 by an inverter 196 to prevent the flip-flop from being triggered when an error signal exists on line 558.

The Q output of flip-flop FF1, which appears on line 201, is termed a "start strobe" signal. A three-input NAND circuit 202 responsive to the start strobe signal and to a "CLKA" clock on a line 204 provides an input to a four-bit counter 206. A four-input NAND circuit 208 connected to the $\overline{R}$ or inverted reset terminal of flip-flop FF1 holds the flip-flop in its triggered state until the count of counter 206 reaches 15, at which time the flip-flop is permitted to reset. An inverter 212 responsive to an "on-off" signal on a line 490 likewise is connected to the $\overline{R}$ terminal of flip-flop FF1. A two-input NAND circuit 214 responsive to the output of an inverter 216 the input of which is connected to ground and responsive to the signal on line 178 provides one input to a two-input NOR circuit 218 the other input of which is provided by a NAND circuit 198 to apply a clearing signal to the counter 206 at the appropriate time.

I apply the start strobe output at the Q terminal of flip-flop FF1 to one input of a three-input NAND circuit 220, a second input of which is provided by an oscillator signal on line 222, the source of which will be described hereinbelow. NAND circuit 198 provides the third input for the NAND circuit 220. I apply the output of circuit 220 to the CP or clock pulse terminal of flip-flop FF2. The Q output of FF2, also designated as "M1", is coupled to the D terminal of FF2 and to the Q terminal of flip-flop FF3. The $\overline{Q}$ output of flip-flop FF2 is designated as $\overline{M1}$. The Q output of flip-flop FF3, also designated as M2, is coupled to the D terminal of flip-flop FF3. The $\overline{Q}$ output of FF3 is designated as $\overline{M2}$. An inverter 224 responsive to the Q output of flip-flop FF1 or "start strobe" signal is connected to the $\overline{R}$ terminals of flip-flops FF2 and FF3. A two-input NAND circuit 226 receives one input from line 178 and a second input from the $\overline{Q}$ output of FF3 to apply a signal to the $\overline{R}$ terminals of FF2 and FF3 at the proper time.

Flip-flops FF2 and FF3 together comprise a two-bit M counter, indicated generally by the reference numeral 225, which is clocked by positive-going level changes occurring at the output of NAND circuit 220, and which has a first bit output M1, a second bit output M2, and their respective complements $\overline{M1}$ and $\overline{M2}$. This counter is used to time the load digit pulses. NAND circuit 198, which receives as inputs the signals M1 and M2, produces an 0 on an $\overline{M=3}$ line whenever the count M is at three. Inverter 200 inverts the output of NAND circuit 198, thereby producing an M=3 signal.

The start strobe signal output of FF1 is applied to one input terminal of a three-input NAND circuit 228, the other inputs of which are provided by a line 380 carrying a "$\overline{\text{delay}}$" signal, the source of which will be described hereinbelow, and by line 162 which, as is pointed out hereinabove, carries an output signal when content of the shift register 44–52 is zero. Another two-input NAND circuit 232 receives one input from the complement of the start strobe signal at the $\overline{Q}$ terminal of FF1 and a clocking signal designated "clock" from a line 234. The respective NAND circuits 228 and 232 provide input signals for NAND circuits 236 and 238. The output of each of the NAND circuits 236 and 238 is coupled to an input terminal of the other NAND circuit 238 and 236. NAND circuits 236 and 238 comprise a flip-flop which has Q and $\overline{Q}$ outputs provided by circuits 236 and 238, respectively, and which is set and reset by 0's appearing at the outputs of NAND circuits 228 and 232, respectively. NAND circuit 236 provides one input for a two-input AND circuit 240, the output of which is the "load first digit" signal for line 42. NAND circuit 238 provides one input for a two-input NAND circuit 242, the output of which appears on line 59 as a negative-going "$\overline{\text{clear shift register}}$" pulse.

The M=3 signal appearing at the output of inverter 200 is coupled to the CP input of flip-flop FF4. The D input of FF4 is driven by the $\overline{Q}$ output of that flip-flop, designated as $\overline{Q1}$, as is also the CP input of flip-flop FF5. The Q output of FF4 appears on a Q1 line 251. The CP input of flip-flop FF5 receives as an input the $\overline{Q}$ output of that flip-flop, also designated as $\overline{Q2}$. The Q output of FF5 appears on a Q2 line 253. A two-input NOR circuit 258 receives its inputs from a first line 498 carrying a "reset" signal and from a second line 262 carrying a "reset Q flip-flops" signal. The output of NOR circuit 258 is coupled to the $\overline{R}$ terminals of flip-flops FF4 and FF5.

Flip-flops FF4 and FF5 together comprise a two-bit Q counter which is clocked by the M=3 signal appearing at the output of inverter 200 and which has a first bit output Q1, a second bit output Q2, and their respective complements $\overline{Q1}$ and $\overline{Q2}$. This counter, indicated generally by the reference numeral 225, is used to control the sequence of the load digit pulses and to generate the selection loaded signal.

A NAND circuit 244, responsive to the M1 and the $\overline{M2}$ signals, generates an 0 whenever the count M equals one. Circuit 244 provides a signal on line 245 and, in addition, provides one input for each of a number of respective two-input NOR circuits 246, 248 and 250. A two-input NAND circuit 256 responsive to the $\overline{Q1}$ output of FF4 and to the $\overline{Q2}$ output of FF5 provides the second input for NOR circuit 246. NOR circuit 246 provides a second input to AND circuit 240 and to NAND circuit 242, which circuits, as described above, provide "$\overline{\text{clear shift register}}$" and "load first digit" signals respectively.

Initially in the load digit pulse generating circuit of FIG. 2, the Q outputs of flip-flops FF1 – FF5 are all 0. When the first digit is selected, which digit is either a 1 or a 2, line $2^0$ or line $2^1$ carries a 1 so that the output of NOR circuit 170 goes to zero and circuit 168 produces a 1 on line 174. So long as standard credit exists, no selection loaded signal is present and no error signal is present, a pulse is applied to the CP terminal of flip-flop FF1 to trigger that flip-flop to produce the start strobe signal. This in turn enables the M counter 225 to be clocked by the oscillator signal through NAND circuit 220. On the first count, a 0 is produced at the output of NAND circuit 244, which output, in conjunction with a 0 output from NAND circuit 256, produces a 1 at the output of NOR circuit 246.

At this point, a load first digit pulse is generated by circuit 240, or a $\overline{\text{clear shift register}}$ signal is generated by circuit 242, depending on the respective outputs of NAND circuits 236 and 238. If shift register sections 44 and 52 are already clear, and there is a delay signal on line 380, NAND circuit 236 will have been triggered into a 1 state at the onset of the start strobe signal, and a load first digit signal will be generated by NAND circuit 240 immediately and cause the first digit to be loaded into the shift register.

Under certain circumstances, these conditions will not be met. If, prior to the initiation of the selection cycle, data was being transmitted from the storage unit, this data will have remained in the shift register. Also, if the selection cycle is initiated before a previous transmission cycle has been completed, line 380 will be at logic 0. If the shift register is not clear, or if a delay signal is absent from line 380, the output of NAND circuit 238 will be 1, causing a 0 signal to be sent out from NAND circuit 242 on line 59, which signal both clears the shift registers 44–52 and triggers the delay signal on line 380. When this has been accomplished, 1's will appear at all of the inputs to NAND circuit 228, thereby triggering NAND circuits 236 and 238 into 1 and 0 states, respectively. When this occurs, a load first digit signal is generated on line 42 and, at the same time, the $\overline{\text{clear shift register}}$ signal on line 59 is disabled.

When flip-flops FF2 and FF3 count to two, a 1 is generated by NAND circuit 244, turning off the load digit pulse. When a count of three has been reached, an $\overline{M=3}$ signal of level 0 appearing at the output of NAND circuit 198, is applied to NAND circuit 220, thereby inhibiting further counting. There is also generated at this point an M=3 signal at the output of inverter 200. This signal is applied to the CP input of flip-flop FF4, thereby advancing the Q count from zero to one, so that, when a second key is actuated, a "load second digit" signal will be generated on line 50 when the M counter 225 counts to one.

If the selector switch actuated is reopened before the M counter 225 has counted to two, a 0 will be produced at the output of NAND circuit 226, thereby clearing flip-flops FF2 and FF3 and inhibiting further operation until a selector switch is again actuated. Although a digit will have been loaded if the M counter 225 has counted to one, the Q counter 255 will not have been indexed and another digit will be loaded into the same register portion when operation is resumed. This feature serves to discriminate between spurious pulses of short duration owing to contact bounce as from jarring of the machine and genuine signals resulting from positive switch closure.

So long as either a key is pushed or the M count is less than three a 1 will appear at the output of NAND circuit 214, producing a 0 at the output of NOR circuit 218, holding the counter 206 at reset. When the key is released and the M counter reaches three, the clearing signal is removed, thereby enabling the counter 206 to be triggered by CLKA. When the count reaches 15, the NAND circuit 208 goes to 0, resetting the start strobe flip-flop FF1. By this means, a start strobe pulse has been generated which remains on for a predetermined period of time following the reopening of a selector switch. This helps to prevent the erroneous loading of data which might otherwise occur due to switch bounce and the like.

When flip-flop FF1 resets, a 0 is produced at the output of inverter 224, resetting flip-flops FF2 and FF3. When flip-flops FF2 and FF3 are reset, a 0 appears at the output of NOR circuit 218, resetting the counter 206. The 1 appearing at the $\overline{Q}$ output of flip-flop FF1 when that flip-flop is reset is also used, in conjunction with the clock signal on line 234, to produce a 0 at the output of NAND circuit 232 and thereby reset the outputs of NAND circuits 236 and 238 to 0 and 1 respectively.

The above-described operation of flip-flops FF1-FF3 is repeated when buttons are actuated to select second and third digits of the number of the selection to be played. When, after the second button is pressed, the M counter counts to one, Q1 and Q2 are at levels 1 and 0 respectively. Therefore, 0 signals will appear at both inputs to NOR circuit 248, producing a 1 on the load second digit line 50. When the M counter counts to three, Q1 and Q2 change to 1 and 0 respectively. As a result, 0 signals will appear at both inputs to NOR circuit 250, producing a load third digit signal on line 58 when, after the third button is pressed the count M reaches one. When the M counter 225 counts to three this third time, Q2 will change to 1, causing a selection loaded signal to be generated at the output of NOR circuit 252 on line 190. This latter signal is conveyed to the transmitting section, shown in FIGS. 4A and 4B, where it is used to trigger the transmitting cycle whereby the shift register contents are serially transmitted to the storage unit.

Figures 3, 5:
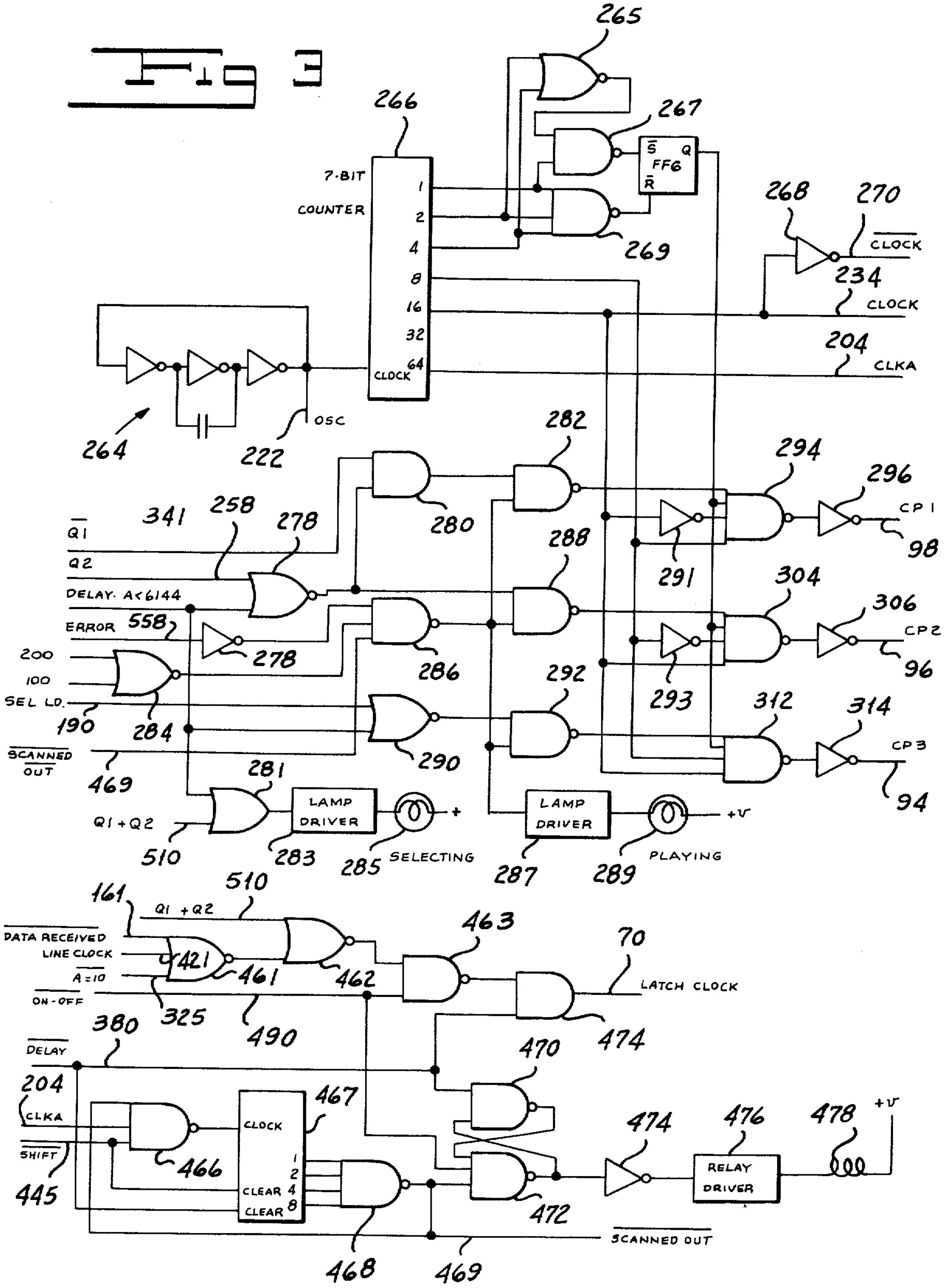
FIG. 3 is a schematic view illustrating the clock pulse generating, display control and mode indicator portions of my ten button selector for an automatic phonograph.
FIG. 5 is a schematic view of the latch control and scanned out status portions of my 10 button selector for an automatic phonograph.

Referring now to FIG. 3, I have shown the system for generating the various clock pulses as well as for generating the readout pulses for translating the information from the latch 68 to the various display devices 122, 124 and 126. As oscillator 264 which may, for example, have a frequency of oscillation of between about 32 and 64 KHz provides clock pulses for a seven bit counter 266. The 16's place of the counter 266 provides the system with its basic timing signal on "clock" line 234. An inverter 268 provides the complement of the clock pulses on a "$\overline{\text{clock}}$" line 270. The 64's place of the counter 266 provides the CLKA clock on line 204. A NAND circuit 269, responsive to the 1's, 2's and 4's place outputs of the counter 266 drives the $\overline{R}$ terminal of an RS type flip-flop FF6 which is set by a 0 at the $\overline{S}$ input and is reset by a 0 at the $\overline{R}$ input. NAND circuit 267, responsive to the 1's place counter output and to a NOR circuit 265, controls the $\overline{S}$ input of flip-flop FF6. NOR circuit 265 derives its inputs from the 2's and 4's place counter outputs.

The Q2 output from flip flop FF5 and a line 341 carrying a "delay·A<6144"signal provide inputs for a two-input NOR circuit 278 which provides one input for a two-input AND circuit 280. The other input for the two-input AND circuit 280 is derived from the $\overline{Q1}$ output of flip-flop FF4. AND circuit 280, in turn, provides one input to AND circuit 282. An exclusive NOR circuit 284 receives its inputs from the 200 and 100 outputs of the latch 68. Exclusive NOR circuit 284 provides one input to a three-input NAND circuit 286. The error signal, inverted by inverter 279, provides a second input to circuit 286. A third input is provided by a "$\overline{\text{scanned out}}$" signal on line 469; this latter signal, as described hereinbelow, assumes a 0 value whenever no more records remain to be played.

Circuit 286 provides the second input for the NAND circuit 282. A four-input NAND circuit 294 receives its inputs respectively from circuit 282, the Q output of flip-flop FF6, an inverter 291 coupled to the clock line 234, and from the 8's place output of counter 266. When all of the inputs to 294 are 1, it produces a 0 at its output terminal which is inverted by inverter 296 to provide the CP1 pulse on line 98.

Circuit 286 also provides one input for a two-input NAND circuit 288, the other input of which is supplied by NOR circuit 278. Circuit 288 provides one input for a four-input NAND circuit 304. The other three inputs for circuit 304 are supplied by the Q output of flip-flop FF6, in inverter 293 coupled to the 8's place counter output, and the clock line 234. When circuit 304 has 1's at all of its inputs it produces a 0 at its output which is inverted by inverter 306 to provide the CP 2 pulse on line 96.

Circuit 286 provides one input for a third two-input NAND circuit 292, the other input of which is supplied by a two-input NOR circuit 290 responsive to the delay·A<6144 signal on line 341 and to the selection loaded signal on line 190. circuit 292 provides one input for a four-input NAND circuit 312 the other three inputs of which are provided by the Q output of flip-flop FF6, the 8's place counter output, and the clock line 234. When circuit 312 has all ones at its input it produces a zero output which is inverted by inverter 314 to provide the CP3 pulse on line 94.

Finally, circuit 286 drives a lamp driver 287, the output of which is connected to one terminal of a "playing" indicator lamp 289. The other terminal of the lamp 289 is connected to a suitable positive voltage source. A "selecting" indicator lamp 285, having one terminal connected to a positive voltage source, is driven by a lamp driver 283. The lamp driver 283 is in turn driven by a NOR circuit 281, which receives as inputs the delay. A<6144 signal on line 341 and a Q1·Q2 signal on line 510 (generated in the circuit shown in FIG. 6).

Figure 7:
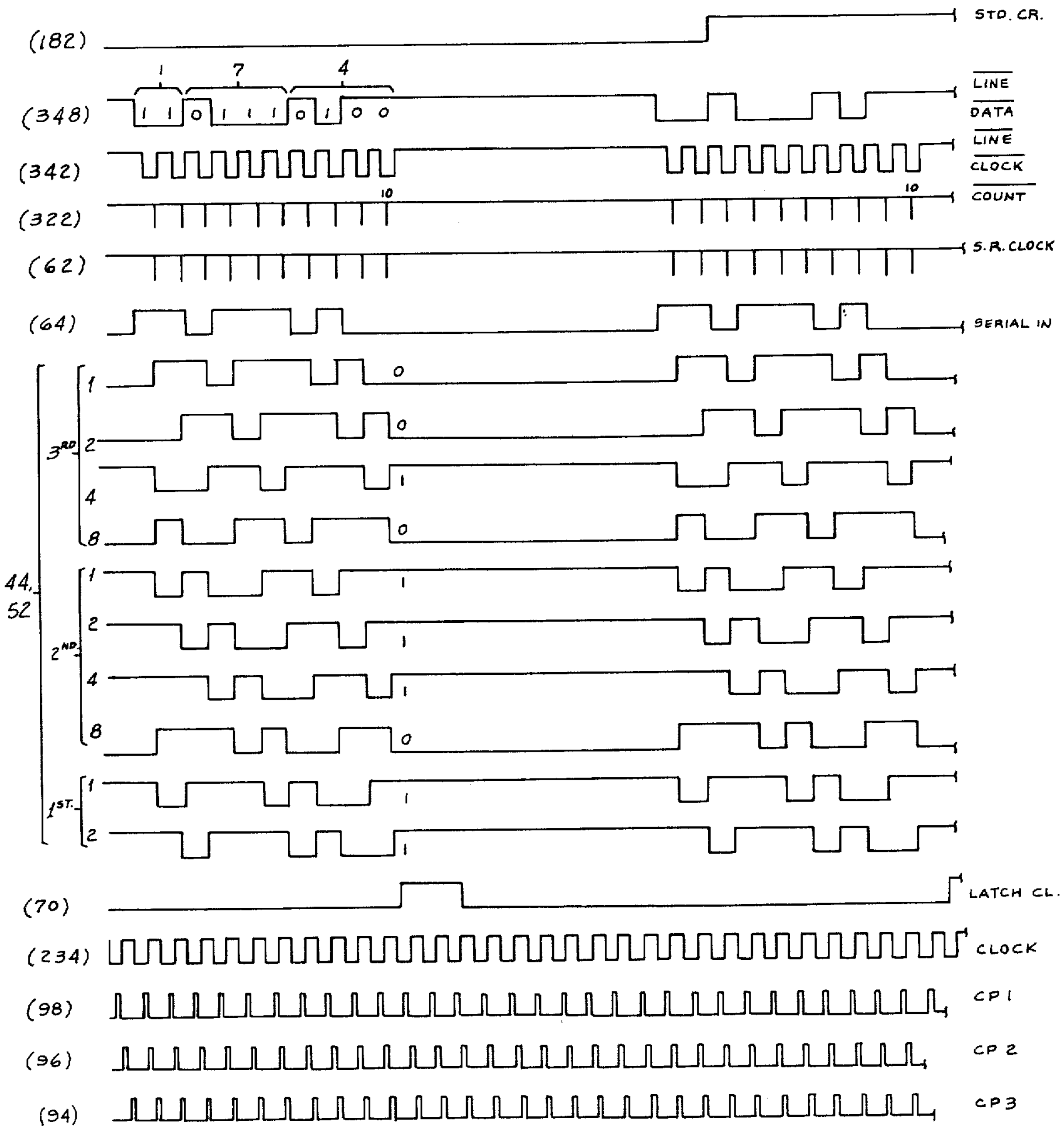
FIG. 7 is a diagrammatic view of the wave forms at various points in my ten button selector for an automatic phonograph when a particular selection is being played.
Figure 8A:
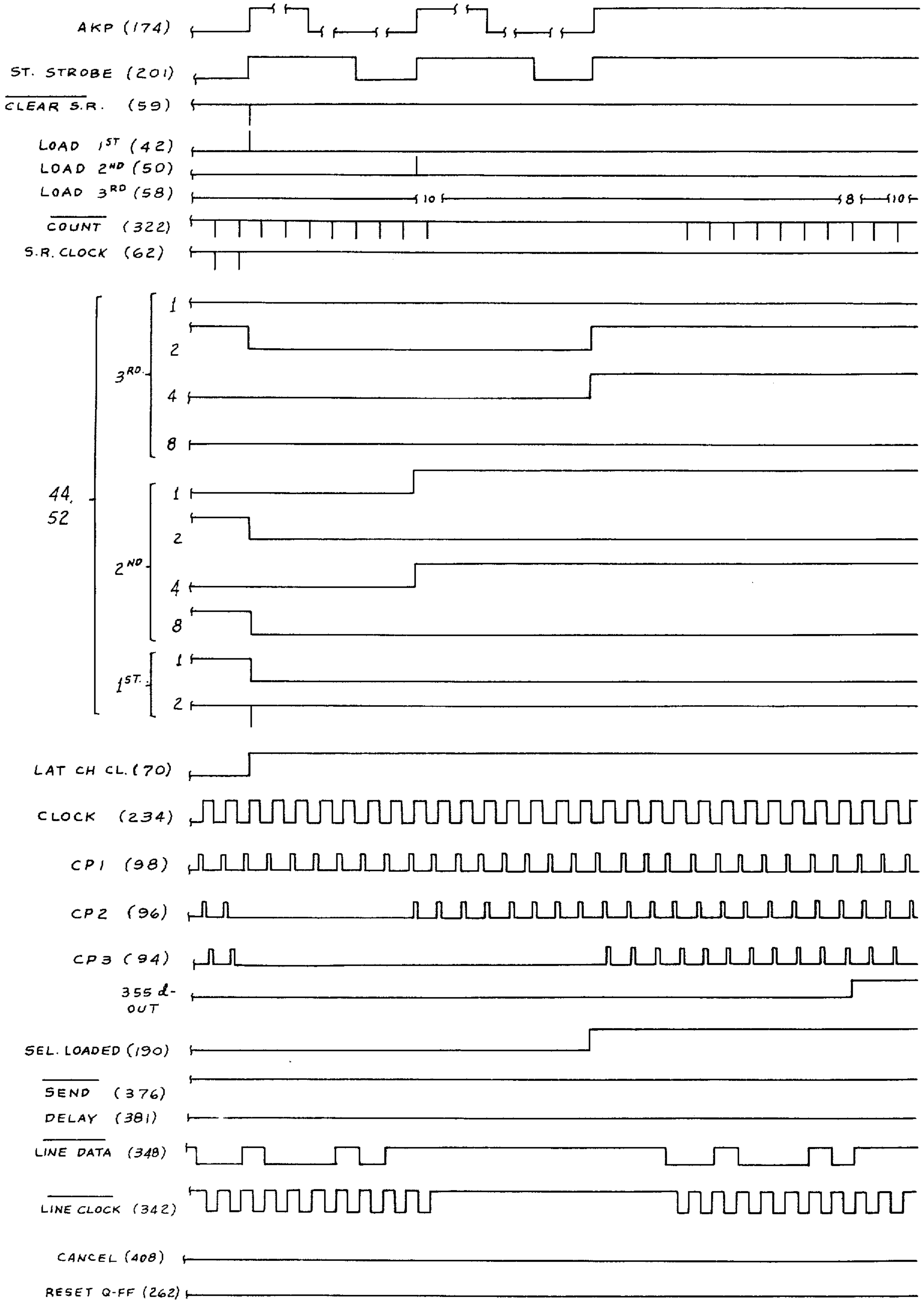
FIG. 8A and 8B are diagrammatic views illustrating the wave forms at various points in my 10 button selector for an automatic phonograph when a particular selection is being made.
Figure 8B:
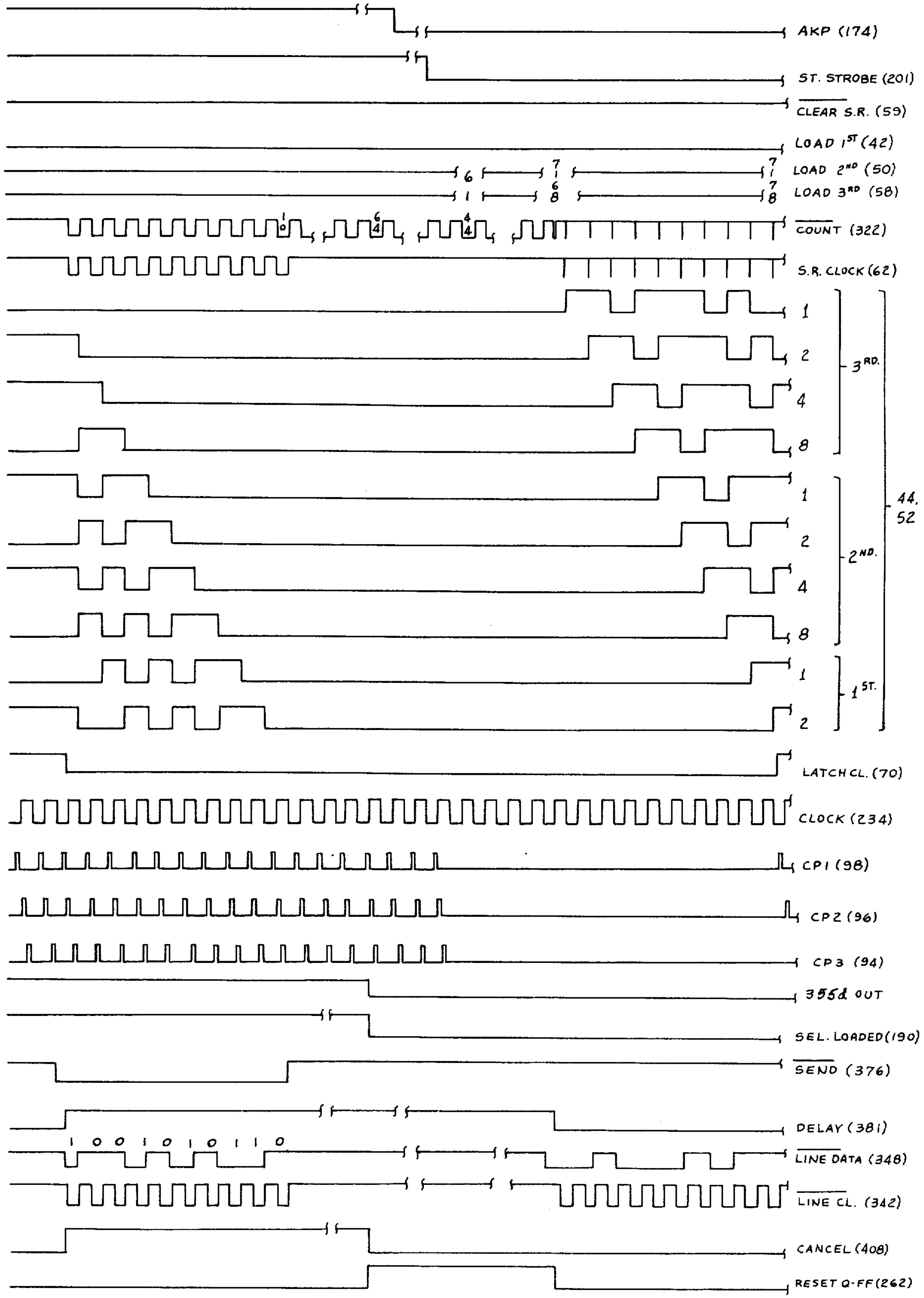

It will be seen that the generation of multiplex pulses CP1, CP2, and CP3 is controlled by signals appearing at the outputs of NAND circuits 282, 288 and 292, respectively. When these NAND circuits are all producing 1's, pulse trains CP1, CP2, and CP3 will appear on lines 98, 96 and 94, respectively, the pulses being staggered with respect to one another as shown in FIGS. 7, 8A and 8B.

When no records are being either played or selected, the Q2, delay.A<6144, error, 200, 100, selection loaded, Q1·Q2 and $\overline{\text{scanned out}}$ lines are all at 0, while the $\overline{\text{Q1}}$ line is at 1. As a result, NAND circuits 282, 288, and 292 produce only 0's, thereby inhibiting the generation of any readout clock pulses. Both the selecting and playing lamps 285 and 289 remain off. When the first digit has been selected by actuating a selector button, and flip-flop FF4 changes state, the Q1·Q2 signal changes to 1, while $\overline{\text{Q1}}$ changes to 0. As a result, the selecting lamp 285 turns on, while NAND circuit 282 now produces a 1, allowing pulses to appear on the CP1 line 98. The CP1 pulses in turn allow the first digit selected and loaded into the shift register to be displayed by lamp 122.

When the second digit is selected and the flip-flops FF4 – FF5 change state, $\overline{\text{Q1}}$ returns to 1, while Q2 also changes to 1. NAND circuit 282 continues to generate a 1 and NAND circuit 288 now also produces a 1. This causes pulses to appear both on the CP1 linen 98 and the CP2 line 96, thereby allowing both the first and second loaded digits to be displayed. When the third digit is selected and flip-flop FF4 changes state, Q2 remains at 1 and the selection loaded signal now appears on line 190. When this occurs, circuits 282, 288 and 292 all produce 1's, thereby causing pulses to appear on the CP1, CP2, and the CP3 lines. As a result, all three indicator lamps 122, 124 and 126 will be driven and the entire three-digit number will be displayed.

Because the three-digit number is also stored in the latch 68, it is possible to display this number for a predetermined period of time after it is transmitted from the shift register 44–52 to the central storage unit. To facilitate this, the delay.A<6144 signal appears on line 341 at the onset of transmission, and remains on that line for 6143 clock periods thereafter, in a manner to be described. While this signal remains on, circuits 282, 288 an 292 continue to produce 1's, thereby continuing the pulses on the CP1, CP2 and CP3 lines, respectively, and the selecting mode lamp 285 remains on. The Q1, Q2, and selection loaded signals are all reset while delay.A<6144 is on so that, when the latter signal turns off, pulses CP1-CP3 and the selecting lamp 285 are extinguished, thereby terminating the display. This operation is repeated every time a record is selected.

Pulses CP1 - CP3 will also be generated between selections if a record is playing, thus allowing the display of the number of the record being played. If this number has been correctly received from the storage unit, both the first digit data bit and the parity bit output places of the shift register 44–52 and the latch 68 will contain identical bits — i.e., two 1's or two 0's — and the latch 100 and 200 lines will carry identical signals. Error line 558 and $\overline{\text{scanned out}}$ line 469 carry a 0 and a 1 respectively. As a result, NAND circuit 286 generates a 0, causing circuits 282, 288 and 292 to produce 1's and turn on pulse trains CP1, CP2 and CP3, respectively. Thus the display lamps 122, 124 and 126 are energized whenever a correctly received signal from the storage unit is stored in the latch 68. The 0 generated by circuit 286 also energizes the playing mode lamp 289.

It will be recalled that the 100 and 200 latch outputs may also be identical if an incorrect first digit is loaded into the shift register 44–52 during the selecting operation. When such identical bits occur during the selecting operation, however, an error signal is generated on line 558. This produces a 0 from inverter 279, inhibiting the signal from the exclusive NOR circuit 284 and thus preventing a spurious display.

From the structure thus far described, it will be apparent that after the selection switches 50 and 59 have been actuated so as in sequence to feed representations of three digits into the system, and after the selection is loaded, the shift register including sections 44 and 52 contains the selection in binary coded decimal form. That is to say, the two lowermost places in register section 44 carry the first digit data and parity bits, the three uppermost outputs of this section and the lowermost output of section 52 carry a binary-coded representation of the second digit, while the four uppermost places in register section 52 contain a binary coded representation of the third digit. I provide my system with means for transmitting this information to the record selection section of a juke box, for example. More particularly, I transmit the information in the form of a train of pulses representing the binary coded decimal selection and a train of ten clock pulses. In response to the information train and the clock pulses a record selected will be withdrawn from the storage system and played for the customer.

Figure 4A:
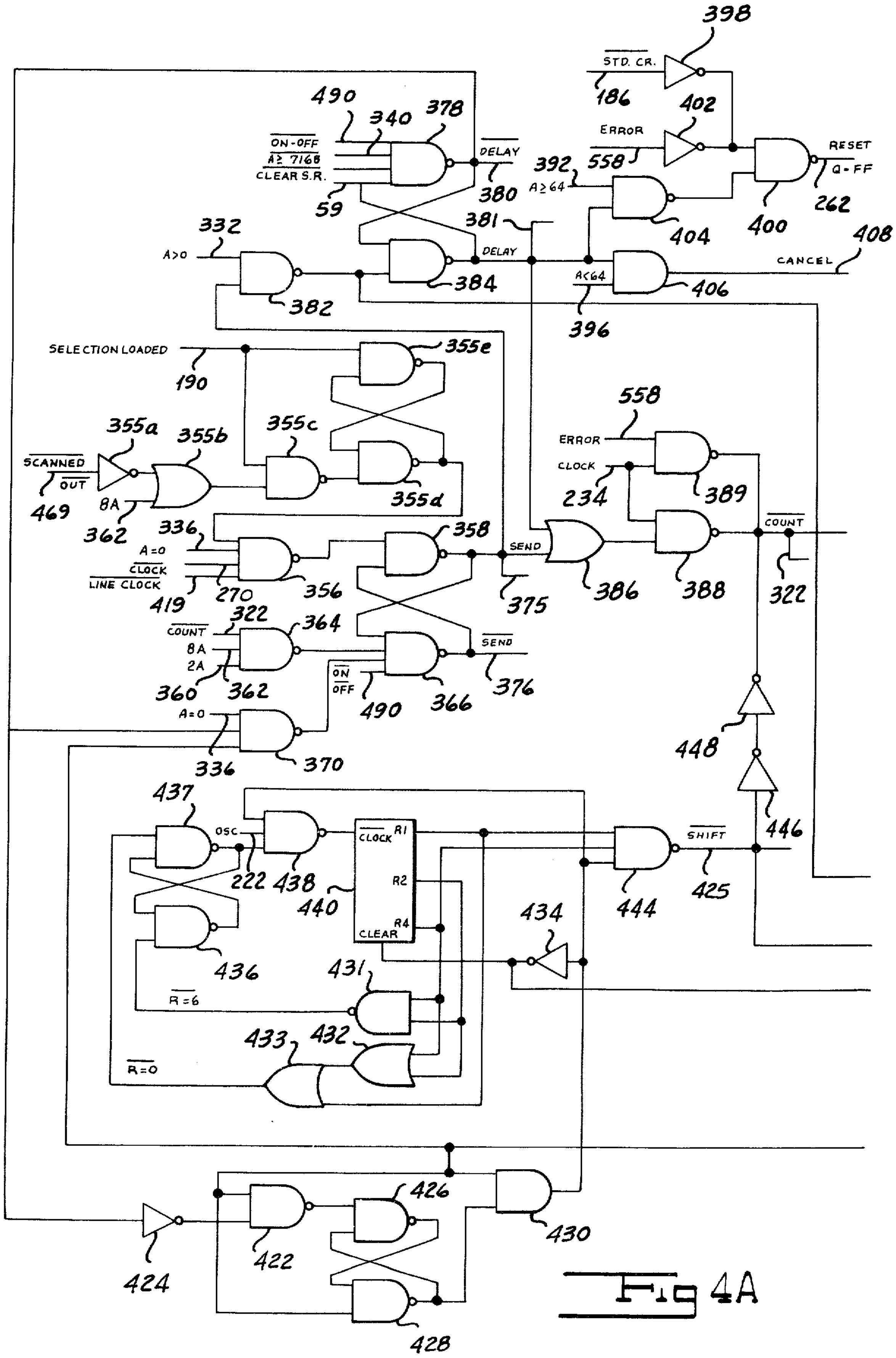
FIGS. 4A and 4B are schematic views illustrating the counter and transmit-and-receive portions of my ten button selector for an automatic phonograph.
Figure 4B:
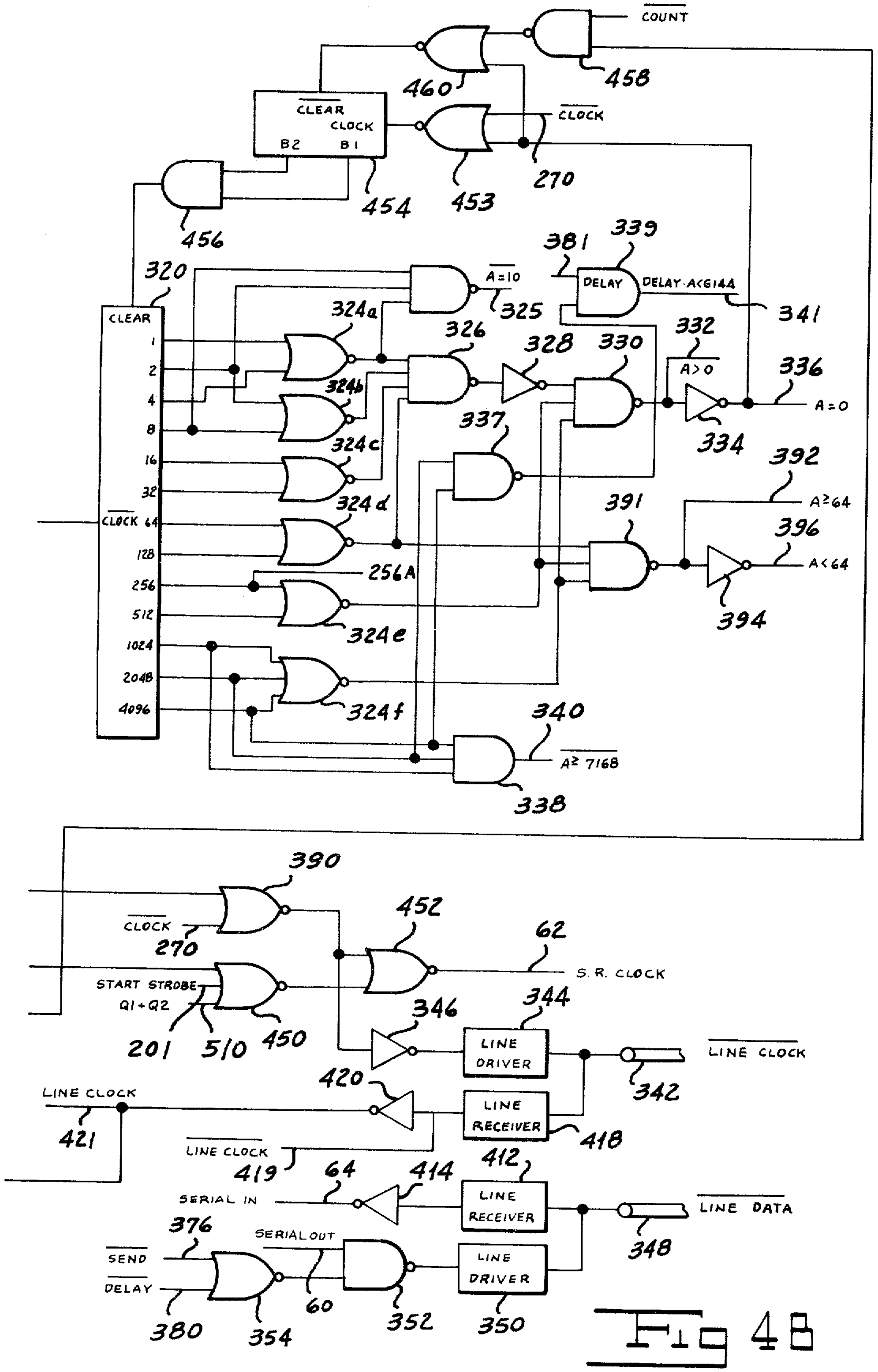

Referring now to FIGS. 4A and 4B of the drawings, the transmitting section of my system includes a 13-bit counter 320 adapted to receive input pulses on a "count" line 322. A plurality of respective circuits 324*a* to 324*f* and 338 are responsive to the information contained in the counter 320. NOR circuit 324*a* is responsive to the 1's and 4's place outputs. NOR circuit 324*b* is responsive to the 2's and 8's place outputs. NOR circuit 324*c* is responsive to the 16's and 32's place outputs. NOR circuit 324*d* is responsive to the 64's and 128's place outputs. NOR circuit 324*e* is responsive to the 256's and 512's place outputs. NOR circuit 324*f* and NAND circuit 338 are each responsive to the 1024's, 2048's and 4096's place outputs of counter 320. A four-input NAND circuit 326 responsive to the outputs of NOR circuits 324*a* to 324*d* provides a zero at its output when none of the 1's, 2's, 4's, 8's, 16's, 32's, 64's and 128's output places of counter 320 carries an output. NOR circuit 324*e* provides an output when neither of the 256's or 512's places of the counter 320 carries an output. Similarly, NOR circuit 324*f* provides an output when neither the 1024's, 2048's nor the 4096's places of the counter 320 carries an output. An inverter 328 applies the output of NAND circuit 326 to a NAND circuit 330 while the two NOR circuits 324*e* and 324*f* apply their outputs directly to the circuit 330. From the structure just described, it will readily be appreciated that when none of the output places of counter 320 carries an output, circuit 330 produces a zero at its output terminal. When, on the other hand, any of the output places of the counter 320 carries an output, the output of circuit 330 is a 1 so that an A>0 signal appears on a line 332. When the output of circuit 330 is a zero an inverter 334 produces a 1 on an output line 336 to indicate that the content A of the counter 370 is zero.

My system includes a three-input NAND circuit 391 for producing an output on an A ≥ 64 line 392 whenever the content of the counter 320 is equal to or greater than 64. The respective NOR circuits 324*d*, 324*e* and 324*f* provide the inputs for the NAND circuit 391. An inverter 394 connected to the output of the NAND circuit 391 provides a signal on an A<69 line 396 indicating that the count of the counter is less than 64. NAND circuit 338 provides a 0 output on an $\overline{A \geq 7168}$ line 340 to indicate that the content in the register equals or exceeds 7168.

NAND circuit 337, coupled to the 2048 and 4096 counter outputs, produces a 1 whenever the counter output is less than 6144. This output, together with a "delay" signal on line 381, are fed to an AND circuit 339, which circuit produces a delay·<6144 signal on line 391 whenever both of its inputs are 1's.

NAND circuit 325, coupled to the 2's and 8's place counter outputs and the output of NOR circuit 324*a*, produces a 0 output on line 325 whenever a ten is stored in the counter 320, considering only the four least significant output places. Line 325 is referred to as the $\overline{A=10}$ line for convenience, although it will also carry a signal when the counter output A is 10 plus any multiple of 16.

The clock, or timing pulses, referred to hereinabove, are both transmitted to and received from the storage unit over a single transmission line 342 which, when quiescent, is at a 1 logic level. Received pulses are passed through a line receiver 418, the output of which is fed to a "$\overline{\text{line clock}}$" line 419 and to an inverter 420. The output of inverter 420 appears on line clock line 421. Timing pulses which are to be transmitted over line 342 are first passed through an inverter 346 and a line driver 344.

Similarly, data pulses are both transmitted to and received from the storage unit over a single transmission line 348. Data transmitted serially from the shift register over line 60 drives one input of a NAND circuit 352, the other input of which is driven by NOR circuit 354. NOR circuit 354 is driven by a "$\overline{\text{send}}$" signal and by a "$\overline{\text{delay}}$" signal, the sources of which are to be described. The output of NAND circuit 352 is coupled to line 348 via a line driver 350. Incoming data signals on line 348 are passed through a line receiver 412 to an inverter 414, the output of which appears on a line 64 coupled to the serial input of the shift register 44–52.

I provide my system with means responsive to the selection loaded signal on line 190 for initiating the transmission of data over line 348. NAND circuits 355d and 355*e* are responsive to the output of NAND circuit 355*c* and to the selection loaded signal on line 190, respectively. In addition, circuits 355*d* and 355*e* are each responsive to the output of the other. NAND circuit 355c is responsive to the selection loaded signal and to the output of a NOR circuit 355*b*. NOR circuit 355*b* in turn is coupled to the 8A line 362, and to the $\overline{\text{scanned out}}$ line 469 through inverter 355*a*. Circuits 355*d* and 355*e* comprise a flip-flop wherein circuit 355d is reset whenever the selection loaded signal changes to 0, and is set whenever selection loaded is 1 and either 8A or "scanned out" (i.e., the output of circuit 355*a*) is also 1.

A four input NAND circuit 356 receives the output of circuit 355*d*, the A=0 signal from line 336, the $\overline{\text{clock}}$ signal on line 270, and the signal on $\overline{\text{line clock}}$ line 419 to provide one input for a two-input NAND circuit 358. Respective lines 360 and 362 leading from the 2's place and the 8's place of counter 320 provide two inputs for a three-input NAND circuit 364, the other input of which is provided by the $\overline{\text{count}}$ signal on line 322. NAND circuit 364 provides one input for a four input NAND circuit 366 which receives a second input from a line 490 carrying an $\overline{\text{on-off}}$ signal from a source to be described hereinbelow. A three-input NAND circuit 370 responsive to the A=0 signal on line 336, to the $\overline{\text{delay}}$ signal on line 380, and to the line clock signal on line 421, provides the third input for circuit 366. Circuit 358 provides the fourth input for circuit 366 which, in turn, provides the second input for circuit 358. The output of circuits 358 and 366 appear on a "send" line 375 and on a "$\overline{\text{send}}$" line 376, respectively. NAND circuits 358 and 366 comprise a flip-flop wherein a "send" signal is triggered whenever a 0 appears at the output of NAND circuit 356, and a "$\overline{\text{send}}$" signal is triggered whenever a 0 appears at the output of NAND circuit 364, at the output of NAND circuit 370, or on the "$\overline{\text{on-off}}$" line 490.

A four-input NAND circuit 378 responsive to the $\overline{\text{on-off}}$ signal on line 490, to the A ≥ 168 signal on line 340, to the $\overline{\text{clear shift register}}$ signal on line 59, and to the output of a two-input NAND circuit 384 provides a "$\overline{\text{delay}}$" signal on a line 380, which signal provides the other input for the NOR circuit 354. A two-input NAND circuit 382, one input of which is provided by the A>0 line 332 and the other input of which is provided by NAND circuit 358, provides one input for circuit 384, the other input of which is derived from line 380. Circuit 384 provides a "delay" signal on line 381. NAND circuits 378 and 384 comprise a flip-flip wherein a delay signal is triggered whenever a 0 appears at the output of NAND circuit 382, while a "$\overline{\text{delay}}$" signal is triggered whenever a 0 appears on the $\overline{\text{on-off}}$ line 490, the A ≥ 7168 line 340, or the $\overline{\text{clear shift register}}$ line 59. A two-input OR circuit 386 which receives respective inputs from circuit 384 and from circuit 358, provides one input for a two-input NAND circuit 388, the other input of which is the $\overline{\text{clock}}$ signal on line 234. NAND circuit 388 in turn drives the $\overline{\text{count}}$ line 322 which clocks the counter 320.

I provide my circuit with means for applying a signal to line 262 to reset the Q flip-flops FF4 and FF5 under certain conditions. An inverter 398 responsive to the $\overline{\text{standard credit}}$ signal on line 186 provides one input to a two-input NAND circuit 400. An inverter 402, responsive to the presence of an error signal, is coupled to the same input of circuit 400. A two-input NAND circuit 404 responsive to the A ≥ 64 signal on line 392 and to the output of NAND circuit 384 provides the second input for the NAND circuit 400. A two-input AND circuit 406 responsive to the presence of a delay signal at the output of NAND circuit 384 and to the signal on line 396 indicating that the content of the counter is less than 64 provides a "cancel" output signal on line 408.

Incoming timing pulses appearing on the line clock line 421 are applied to one input terminal each of a pair of two-input NAND circuits 422 and 428. An inverter 424 couples the delay signal to the other input terminal of NAND circuit 422, which circuit provides a first input for a two-input NAND circuit 426. Circuit 426 provides the other input for NAND circuit 428 which in turn provides the second input for NAND circuit 426. NAND circuits 426 and 428 comprise flip-flop, in which NAND circuit 428 is set by a 0 signal appearing on the line clock line 421 and is reset by a 0 appearing at the output of NAND circuit 422. I apply the line clock signal and the output of NAND circuit 428 to an AND circuit 430. Incoming clock pulses on line 342 are inhibited by this arrangement from appearing at the output of AND circuit 430 while signals are being transmitted from the shift register. While the transmitting cycle is taking place, a delay signal of logic level 0 produces a 1 at the output of inverter 424. This causes NAND circuit 428 to be turned on whenever a 0 appears at the output of inverter 420, and off whenever a 1 appears at that output. At all times during the transmitting cycle, therefore, the output of AND circuit 430 remains at 0. When the transmitting sequence is completed and delay changes back to 1, a 0 will be produced at the output of inverter 424, thereby producing a 1 at the output of NAND circuit 422. NAND circuit 428 will now be turned on by a 0 at the output of inverter 420 but will not be turned off by a 1 at that output, since the output of NAND circuit 422 is being held at 1. By this means, incoming pulses on line 342 are reproduced in inverted form at the output of AND circuit 430, beginning with the first full pulse which starts after the delay signal turns back on.

AND circuit 430 provides one input to a three-input NAND circuit 438, the other inputs to which are provided by the oscillator line 222 and by a NAND circuit 437. NAND circuit 438 drives a three-bit R counter 440 having respective 1's, 2's and 4's place outputs R1, R2, and R4. NAND circuit 437 is crosscoupled in flip-flop fashion to NAND circuit 436, and also receives an input from OR circuit 433. NAND circuit 436 also receives an input from NAND circuit 431. OR circuit 433 is responsive to the R1 counter output and to an OR circuit 432. Circuits 431 and 432 are each responsive to the R2 and R4 outputs of the counter 440. The counter 440 is provided a clear signal by an inverter 434 coupled to the output of AND circuit 430.

Counter outputs R1 and R4 are also applied to two input terminals of NAND circuit 444. NAND circuit 444 receives its third input from AND circuit 430, and is coupled to the count line 322 via inverters 446 and 448. Circuit 444 also drives a "shift" line 445. A NOR circuit 450, coupled to the output of NAND circuit 444, provides one input for a two-input NOR circuit 452, the other input of which is provided by NOR circuit 390. NOR circuit 450 derives its other two inputs from a Q1+Q2 line 510 and from start strobe line 201, while NOR circuit 390 derives its inputs from the output of NAND circuit 382 and from the clock line 270. In addition to driving circuit 452, NOR circuit 390 also drives inverter 346. NOR circuit 452 drives a "shift register clock" line 62 which is coupled to the clock pulse input of the shift register 44–52. Pulses applied to line 62 shift the data appearing on line 64 into the shift register 44–52.

The R counter 440 and its associated circuitry are used to provide a delayed pulse on the count line 322 whenever the output of AND circuit 430 goes positive. Normally, a 0 signal appearing at the output of AND circuit 430 produces a 1 at the output of the inverter 434, keeping the counter 440 clear. Circuits 431 and 433 produce a 1 and a 0 respectively, keeping NAND circuit 437 in a "set" state (i.e., producing a 1). When a 1 appears at the output of AND circuit 430, the existing signal is removed from the clear terminal of counter 440, and the counter is allowed to be clocked by the oscillator signal appearing at one of the inputs to NAND circuit 438. When the count reaches five, a shift signal of logic level 0 is generated on line 445, all of the inputs to NAND circuit 444 then being positive. This signal is applied to the count line 322 through inverters 446 and 448. When the count reaches six, shift returns to 1 and NAND circuit 431 produces a 0 output, which output resets NAND circuit 437. The 0 signal now produced by circuit 437 inhibits the oscillator signal from further clocking the counter 440. The counter is cleared when the output of AND circuit 430 returns to 0.

A two-input NOR circuit 453 responsive to the clock pulse train on line 270 and to the A=0 signal on line 336 clocks a two place B counter 454. An AND circuit 456 responsive to both output places of counter 454 is adapted to apply a signal to the clear input terminal of counter 320. A two-input NOR circuit 458 responsive to the output of inverter 434 and to the count signal on line 322 provides one input for a two-input NOR circuit 460 the other input of which is provided by the A=0 line 336 to provide a signal for the clear input of counter 454.

B counter 454 clears the A counter 320 when a sufficient period has elapsed without the counter 320 being clocked. When the A count is at zero, a 1 appears on line 336, producing a 0 at the output of NOR circuit 460, thereby keeping the B counter 454 clear. When the A counter begins counting, line 336 goes to 0 and the B counter is allowed to be clocked by the clock signal on line 270, but clears whenever either the count signal on line 322 or the output of inverter 434 goes to 0, producing a 1 at the output of NAND circuit 458. If three clock pulses have occurred since the last time a 0 has appeared either on the count line 322 or at the output of inverter 434, the B counter 454 will have counted to three, generating a 1 at the output of AND circuit 456 and resetting the A counter 320. When the A counter 320 is clear, a A=0 signal on line 336 also clears the B counter 454.

The operation of the transmitting cycle will now be treated in some detail. The transmitting sequence, in which the shift register contents are serially transmitted to the storage unit, is initiated by a "selection loaded" signal on line 190. Initially, the outputs of NAND circuits 358 and 366 should be 0 and 1, respectively. When the selection loaded signal appears, NAND circuit **355*d* will turn on to provide a signal to circuit 356 as soon as either a 1 appears on the line 362, indicating the presence of a signal on line 342, or a 0 appears on the scanned out line 469**, indicating that no more records remain to be played.

The 1 appearing at the output of NAND circuit **355*d* will cause NAND circuit 356 to produce a 0, setting the send signal as soon as the A counter 320 returns to zero and the clock signal on line 270 becomes positive. The transmission cycle is thus delayed, when a record is being played by the storage unit, until the end of an incoming pulse train, reducing the possibility of interference by two signals sharing the same line. Since the incoming lines are quiescent when no more records remain to be played, no delay is necessary in this case. This send signal produces a 1 at the output of OR circuit 386, thereby allowing the A counter 320 to be clocked by positive-going edges of the clock signal on line 234. On the first count of A counter, an A>0 signal on line 332 acts in conjunction with the send signal to produce a 0 at the output of NAND circuit 382. This turns on the delay signal, which was initially off. Also at this time, there is generated a delay·A<6144 signal on line 391. This signal continues the display of the selected number until the transmitting cycle is almost complete, as was explained previously. When, after the A counter has counted to 10, the clock signal on line 234 goes negative. 1's appearing on the 2A line, the 8A line, and the $\overline{\text{count}}$ line produce a 0 at the output of NAND circuit 264, thereby resetting the send and $\overline{\text{send}}$ signals to 0 and 1, respectively. Because the delay signal remains on, clocking of the A counter 320** continues.

In the system contemplated, lines 342 and 348 are used in common by a number of selectors. Means are provided, therefore, for inhibiting the transmission cycle if, prior to the first count, an interfering use occurs. In such a case, the initial negative-going pulse of the interfering signal will generate a 1 on the line clock line 421, producing a 0 from NAND circuit 370. The $\overline{\text{send}}$ signal is thus held at 1. At the same time, the $\overline{\text{line clock}}$ signal, applied to NAND circuit 356, produces a 1 at that circuit's output. The coincidence of 1's at the outputs of NAND circuits 356 and 366 produces a 0 from NAND circuit 358, thereby extinquishing the "send" signal if it has already been triggered by the "selection loaded" signal. The line clock signal generated by the initial interfering pulse will also cause a delayed $\overline{\text{count}}$ pulse to be generated in the manner previously described, thereby advancing the counter to 1. When this occurs, the A=0 line will go to 0, thereby preventing either NAND circuit 358 or NAND circuit 366 from being further triggered by NAND circuit 356 or 370, respectively. Thus, circuits 358 and 356 will remain at levels 0 and 1 respectively, so long as the counter 320 is being clocked by the interfering signal. Because NAND circuit 358 has been turned off before the first count, NAND circuit 382 will at all times produce a 1 output, preventing the delay signal from being triggered. Counter 320 will continue to be clocked by succeeding pulses of the interfering pulse train in the manner previously described. When the train has ended, and a sufficiently long quiescent period has elapsed, the counter 320 will be reset by the B counter 454. At this point, the A=0 line returns to a 1 level, thereby allowing the send signal to be triggered and normal operation to be resumed.

The serial transmission of data from registers 44 and 52 takes place between the time of the first count of the A counter 320 and the time that the send signal is reset — that is, while the send and delay signals are both at a 1 logic level. During this period, the output of NAND circuit 382 remains at a 0 level. This enables the NOR circuit 390 and allows the $\overline{\text{clock}}$ signal generated on line 270 to appear at the output of NAND circuit 452 on line 62. This signal is then applied to the clock inputs of registers 44 and 52, thereby clocking out the contents of registers 44 and 52 on positive-going edges of the $\overline{\text{clock}}$ signal. The register contents are serially read out on line 60 and, after being inverted by NAND circuit 352, are transmitted by the line driver 350 along transmission line 348. The pulses appearing at the output of NOR circuit 390 also appear at the output of inverter 346, and are transmitted by line driver 344 along transmission line 342, to be used as timing pulses by the storage unit.

When the delay signal is turned on, there is also generated a cancel signal at the output of AND circuit 406, which is used to generate a "premium cancel" pulse or a "standard cancel" pulse in a manner to be described. When the A counter reaches a count of 64, the A<64 signal on line 396 goes to 0, turning off the cancel pulse. AT the same time, the A ≥ 64 signal on line 392 goes to 1, producing a 0 at the output of NAND circuit 404, thus generating a "reset Q flip-flops" signal at the output of NAND circuit 400. This signal produces a 0 at the output of NOR circuit 258 (FIG. 2), resetting the Q counter flip-flops FF4 and FF5. A 0 is thereby generated at the output of NOR circuit 252 and on the selection loaded line 190, thus allowing another selection to be made, provided that credit remains.

When the count reaches 6144, NAND circuit 337 produces a 0, causing AND circuit 339 in turn to produce a 0, turning off the delay·A<6144 signal on line 341. This blanks the display approximately three quarters of a second before the transmission cycle is complete. When the A counter 320 counts to 7168, an A ≥ 7168 signal on line 340 of logic level 0 is applied to the input of NAND circuit 378, causing the delay and $\overline{\text{delay}}$ signals to reset to 0 and 1, respectively. Because both the delay signal and the send signal are now 0, a 0 will be produced at the output of OR circuit 386, thereby holding the output of NAND circuit 388 at 1 and preventing the A counter 320 from being further clocked by the clock signal on line 234.

At this point the transmission cycle is completed. If, at this point, the storage unit has "scanned out" and no record remains to be played, incoming transmission line 342 will be quiescent at 1. As a result, there will be a 0 at the output of AND circuit 430, and the count line 322 remains quiescent. The counter 320 will therefore be reset after three negative-going clock pulses in the manner previously described. The transmitting section is now in condition for another transmission cycle which will begin with the generation of another selection loaded signal on line 190.

If the storage unit has not "scanned out" and a record is being either played or searched, line 342 will carry a series of ten-pulse trains occurring at periodic intervals. In the manner previously described, these pulses will also appear in inverted form at the output of NAND circuit 430, beginning with the first full pulse which occurs after the delay signal has been turned off. The pulses appearing at the output of AND circuit 430 in turn produce delayed, negative-going pulses at the output of NAND circuit 444 in the manner previously described. These latter pulses are applied, by means of NOR circuit 450 and NOR circuit 452, to the clock inputs of shift registers 44 and 52. At the same time, incoming data pulses on line 348 are inverted by NOR circuit 414 and are applied to the serial input terminal of register 52. By this means, incoming pulses on line 410 are serially loaded into registers 44 and 52 whenever the system has not "scanned out" and the transmitting section is not engaged in a transmission cycle.

The pulses produced at the output of NAND circuit 444 are also passed through inverters 446 and 448 to clock the A counter 320, as was previously described. When a pulse train has ended, count line 322 and inverter 434 will assume their quiescent levels of 1. A sufficient period of time elapses between pulse trains to allow the B counter 454 to count up to three and reset the A counter 320 in the manner described earlier. If the entire incoming pulse train has been reproduced at the output of AND circuit 430, the counter 320 will have counted to 10 (or 7178 if the initial pulse train has been received before the A counter is reset), producing a 0 on the A=10 line 325. This pulse is conveyed to the latch control circuit, shown in FIG. 5, where it is used to generate a pulse loading the contents of the shift register 44–52 into the latch 68. By these means, a continual display of the previous shift register contents may be made, even while the shift register is being loaded with new contents.

The above-described receiving operation is repeated for each train of pulses arriving from the storage unit during the playing mode. The selector unit will return to the selecting mode when standard credit again becomes available if it has become unavailable, and another selection is initiated. When such a selection is initiated, the start strobe signal generated on line 201 holds the output of NOR circuit 450 at o, inhibiting any incoming clock pulses on line 342 from being applied via shift line 445 to the clock input of shift registers 44 and 52 and thereby interfering with the selecting operation. A similar function is performed by the Q1+Q2 signal which appears on line 510 shortly after start strobe and remains until after the number selected is transmitted.

FIG. 5 illustrates the latch control circuit, together with the scanned-out flip-flop circuit. In the latch control circuit, a two-input AND circuit 464 responsive to the delay signal on line 380 and to the output of a two-input NAND circuit 463 is adapted to apply a "latch clock" signal, via line 70, to the clock input terminal of the latch 68. NAND circuit 463 is responsive to the on-off signal on line 490 and to the output of NOR circuit 462. NOR circuit 462 receives inputs from the Q1+Q2 line 510 and from the output of NOR circuit 461. NOR circuit 461 receives inputs, respectively, from the data received signal on line 161, the line clock signal on line 421, and the A=10 signal on line 325.

When the selector unit is turned on, the 0 pulse on the on-off line 490, applied through circuits 463 and 464, produces a 1 pulse on line 70, thereby initially loading the latch 68 with the contents of the shift register (then clear). Line 70 is again energized during the playing mode period to load into the latch 68 information received from the storage unit and loaded into the shift register 44–52. If a complete train of 10 pulses has been received, the counter 320 will have counted to 10, as has been described. As a rsult, a 0 appears on the A=10 line 325. When the last timing pulse has been received and has terminated, there will also appear a 0 on the "line clock" line 421. Furthermore, if the information has been correctly received from the storage unit, the two most significant bits stored in the shift register will be either both 1's or both 0's and, as a result, a 0 will appear on data received line 161. The coincidence of these three signals produces a 1 at the output of NOR circuit 461. This signal is passed through circuits 462, 463 and 464 to produce a 1 on the latch clock line 70, thereby producing the desired result of loading the latch 68. The above-described operation is repeated each time a complete pulse train has been received, thus insuring a continual updating of the contents of the display latch 68.

Line 70 is also energized whenever selection information is loaded into the shift register in response to manual actuation of the selector buttons. When at least one digit thus generated has been loaded into the shift register, a 1 signal appears on the Q1+Q2 line, which signal, applied through circuits 462, 463, and 464, produces a 1 on the latch clock line 70. Information loaded into the shift register during the selection operation is thereby immediately loaded into the latch 70, and hence made available for display purposes. When the delay signal on line 380 turns off, signaling the beginning of the transmission cycle, this 0 signal is gated with the output of NAND circuit 463 to produce a 0 on line 70, turning off the latch clock signal. As a result, latch 68 stores that information which appeared in the shift register immediately preceding the termination of the latch clock signal, and which is now being shifted out of the register and transmitted to the search unit. When, at the end of the transmission cycle, the delay signal is again turned on, the output of NAND circuit 463 is again applied to line 70, and the latch 68 may be energized in a subsequent selecting mode or playing mode, as the case may be, in the manner just described.

Means are provided for disabling the selector unit speaker (not shown) whenever the continued absence of incoming signals indicates that the storage unit has "scanned out" and that selections are no longer played or searched. In the scanned-out flip-flop circuit, a 3-bit S counter 467 has all of its output places connected to a 4-input NAND circuit 468. NAND circuit 468, which produces a 1 whenever the count is less than 15, drives a "scanned out" line 469. The counter 467 is provided with a clock signal by a NAND circuit 466 which, in turn, is driven by the CLKA line 204, the shift line 445, and the scanned out line 469. Clearing signals are provided to the counter 467 by 0's either on the delay line 380 or on the shift line 445. NAND circuit 468 also drives NAND circuit 472 which, in addition, is responsive to the output of NAND circuit 470 and to the on-off signal on line 490. NAND circuit 470 is driven by the delay line 380 and by the output of NAND circuit 472. NAND circuits 470 and 472 comprise a flip-flop wherein NAND circuit 472 is set by a 0 either on on-off line 490 or scanned out line 469, and is rest by a 0 on delay line 380. NAND circuit 472 also drives an inverter 474 coupled to a relay driver 476. Relay driver 476 is connected to one terminal of a speaker relay 478, the other terminal of which is connected to s suitable positive voltage source.

When the system is first turned on, the negative-going on-off pulse on line 490 sets circuits 470 and 472 at levels 0 and 1 respectively. (The delay signal is initially at 1). So long as circuit 472 is on, a 0 is applied to the speaker relay 478, disabling it. Whenever a transmission cycle is taking place, the 0 signal on line 380 turns on circuit 470 and clears the counter 467, producing a 1 on the scanned out line 469. Since 1's now appear at all of the inputs to NAND circuit 470, that circuit is turned off, thereby enabling the speaker relay 478.

NAND circuit 472 will also be turned on, and the speaker relay disabled if, following a transmission cycle, the transmission line 342 remains quiescent for a predetermined period of time. In the absence of a 0 signal either on line 380 or on line 445, the counter 467 is free to be clocked by the CLKA signal on line 204. This clocking will continue until a count of 15 has been reached, at which time a 0 will be produced on the scanned out line. This signal, applied to NAND circuit 466, inhibits further counting and also, when applied to NAND circuit 472, causes that circuit to shift to a 1 state and thereby disable the speaker relay 478. The triggering of the flip-flop comprising circuits 470 and 472 is prevented if, before the counter 467 counts to 15, it is cleared by the shift pulse on line 445; the latter signal is generated in response to a signal on line 342 except when transmission is taking place, as was described earlier. If no such signal occurs in the time necessary to count to 15 — i.e., 60 clock periods — triggering will occur and the speaker will be disabled until the next delay pulse. In brief, the scanned-out flip-flop is set, disabling the speaker relay when the selector is first turned on or whenever the system is "scanned out" (no line clock signal for at least 60 clock periods following the last transmission cycle), and is reset, enabling the speaker relay, at the beginning of each transmission cycle.

Referring again to FIG. 1A, the system includes an on-off circuit 488, which produces a 0 pulse when the selector unit is turned on. This signal is sent out on an "on-off" line 490 and is also applied to an inverter 492. Inverter 492 in turn drives an "on-off" line 494 and one of the inputs to OR circuit 496, the other input of which is supplied by NOR circuit 502. NOR circuit 502 receives inputs from one terminal of a reset switch S10, the other terminal of which is grounded, and from line 201 which carries Q output of flip-flop FF1 (FIG. 2). The output of OR circuit 496 appears on a "reset" line 498 and is also inverted by inverter 500 to produce a signal on a "reset" line 501. The system is initialized by the 0 pulse originating from the on-off circuit 488. In response to this signal, 0's are sent out on the on-off line and the reset line 501, while 1's are sent out on the on-off line 494 and the reset line 500.

Those circuits which are reset at the beginning of a 3-digit loading sequence are also controlled by the reset switch S10. Closing this switch will, in conjunction with a 0 start strobe signal, produce a 1 at the output of NOR circuit 502, which in turn produces a 1 on the reset line 498, and a 0 on the reset line 501, thereby resetting the Q flip-flops FF4 and FF5, and the error signal to be described below.

Figure 6:
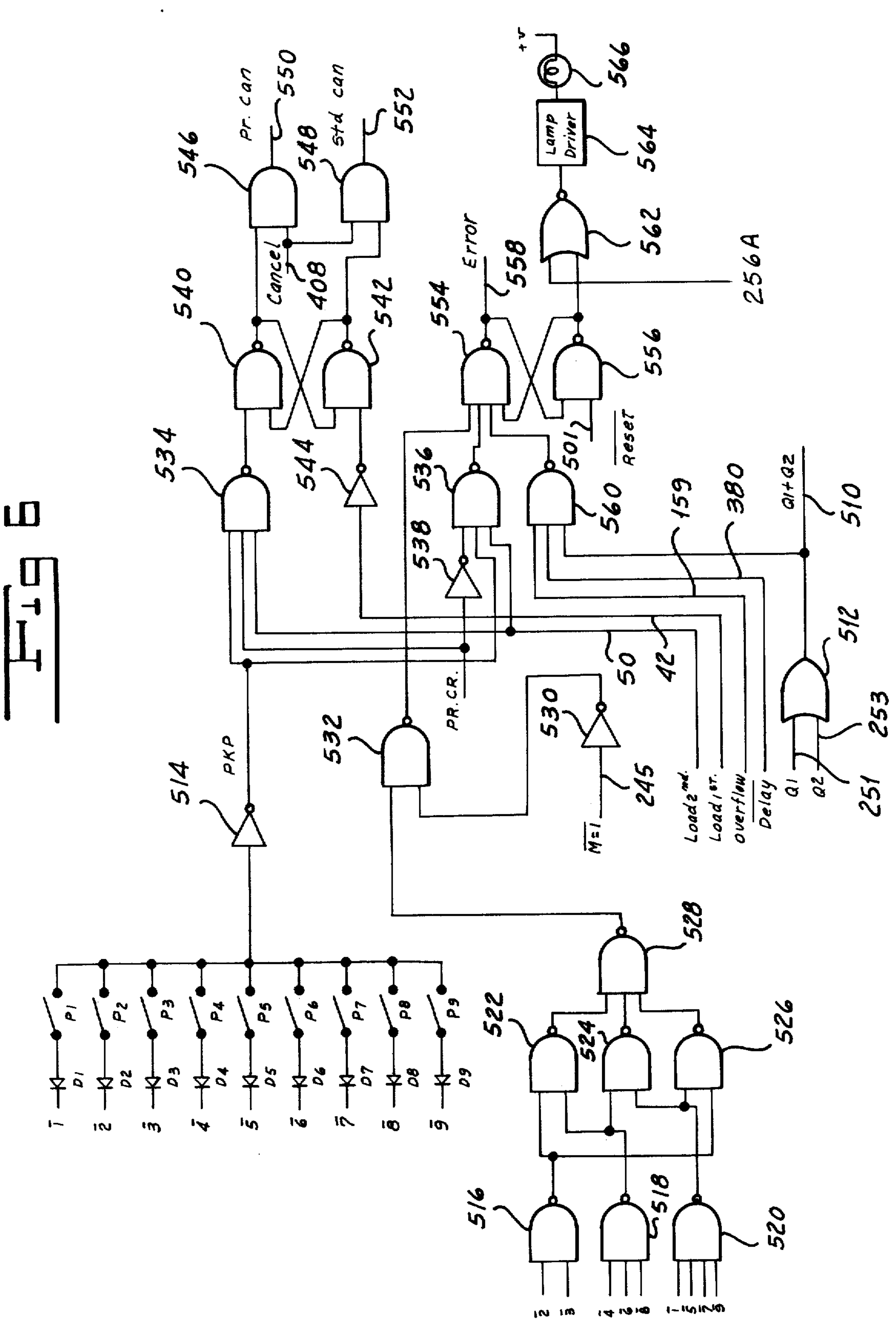
FIG. 6 is a schematic view of the credit cancelling, pulse generating and error status portions of my ten button selector for an automatic phonograph.

FIG. 6 illustrates the premium price comparator, cancel pulse generator, and error status circuits. In the premium price comparator circuit, a plurality of premium pricing switches P1 – P9 each have one terminal connected to the input of an inverter 514, and the other terminal connected to the anode terminal of a diode D1 – D9 respectively. Each of the diodes D1 – D9 has its cathode terminal connected to the ungrounded terminal of a respective selection switch S1 – S9, shown in FIG. 1A.

Switches P1 – P9 are preset to reserve certain digits for "premium" selection. Closing a particular premium pricing switch reserves the corresponding digit as a premium digit. For example, closing the switch P4 will reserve the digit four as a premium digit. Any or all of the digits 1 – 9 may be so reserved. If such a reservation has been made, closure of selection switch S4 to make a selection forms a path from the input of inverter 514 to ground consisting of pricing switch P4, diode D4 and selection switch S4, causing the output of inverter 514 to go positive. Closure of any other "premium" selection switch will produce an analogous result. Thus, inverter 514 provides a signal whenever a "premium" key has been pushed. For convenience, this signal is designated PKP (premium key pushed). Diodes D1 – D9 are used to prevent the selection switch outputs 1 – 9 from interacting with one another.

Means are provided for selectively providing a "standard cancel" or a "premium cancel" signal according to whether a "standard" key or a "premium" key has been actuated to select the second digit of a selection numeral. In the cancel pulse generator circuit, the PKP line and the load second digit line 50 supply two inputs to a three input NAND circuit 534. I apply the premium credit signal from the phonograph credit accumulator system directly to the third input of circuit 534. The credit accumulator system may be of any suitable type known to the art. For example, it may be of the type shown in the copending application of Gerard J. Oosterhouse, Serial No. 376,145, filed July 3, 1973. NAND circuit 534 provides one input for a two-input NAND circuit 540, the other input of which is provided by the output of a NAND circuit 542. An inverter 544 provides the first input for NAND circuit 542 from the load first digit signal line 42. NAND circuit 540 provides the other input for circuit 542. NAND circuits 540 and 542 comprise a flip-flop in which circuit 540 is set by a 0 from NAND circuit 534 and is reset by a 0 signal from inverter 544. In response to an output from circuit 540 and to a cancel signal on line 408 an AND circuit 546 produces a premium cancel signal on a line 550 leading back to the credit accumulator. Another AND circuit 548 responsive to the cancel signal and to an output from NAND circuit 542 provides a standard cancel signal on line 552 leading back to the accumulator.

If, when the second digit is selected, a "premium" key is actuated, and there is premium credit available, all of the inputs to NAND circuit 534 will become positive when the load second digit signal appears on line 50, producing a 0 output from NAND circuit 534. This triggers NAND circuit 540 into a 1 state, with the result that a premium cancel pulse will be produced by NAND circuit 546 and conveyed to the credit accumulator when the cancel pulse is generated by the transmitting section shown in FIGS. 4A and 4B. If, when the second digit is selected, a "standard" key is actuated, NAND circuit 542, which was set by the load first digit pulse, will remain at 1 and cause a standard cancel pulse to be sent out on line 552 when the cancel pulse occurs.

In the error status circuit, an inverter 538 responsive to the premium credit signal provides one input to a three-input NAND circuit 536, the other two inputs to which are provided by the PKP signal from inverter 514 and the load second digit signal on line 50. NAND circuit 536 provides one input for a four-input NAND circuit 554 adapted to provide an error output signal on line 558. A three-input NAND circuit 560 responsive to the output of an OR circuit 512, to the signal on line 380, and to the overflow signal on line 159 provides the second input for NAND circuit 554, the third and fourth inputs to which are provided by the output of NAND circuits 530 and 556 respectively. NOR circuit 512 receives inputs from the Q1 and Q2 signals on lines 251 and 253 respectively. The output of circuit 512 is also applied to a Q1+Q2 line 510. The $\overline{\text{reset}}$ signal on line 501 provides the first input for NAND circuit 556, the second input of which is provided by line 558. NAND circuits 556 and 558 comprise an "error" flip-flop in which NAND circuit 554 is set by a 0 either from NAND circuit 512, NAND circuit 536, or NAND circuit 560, and is reset by a 0 on the reset line. A two-input NOR circuit 562 responsive to the output of NAND circuit 556 and to the 256A output of counter 320 provides the input to a lamp driver 564 to illuminate a lamp 566 connected to a suitable source of potential to indicate a "reset."

NAND circuit 532 is responsive to an inverter 530 and to a three-input NAND circuit 528. Inverter 530 is responsive to the $\overline{\text{M=1}}$ singal on line 245. NAND circuit 528 is responsive to the outputs of NAND circuits 522, 524 and 526, respectively. NAND circuit 522 is responsive to NAND circuits 516 and 518. NAND circuit 524 is responsive to NAND circuits 518 and 520. NAND circuit 526 is responsive to NAND circuits 516 and 520. NAND circuit 516 receives as inputs the signals on the $\overline{2}$ and $\overline{3}$ lines, which originate in the circuit shown in FIG. 1A. NAND circuit 518 receives as inputs the signals on the $\overline{4}$, $\overline{6}$, and $\overline{8}$ lines. NAND circuit 520 receives as inputs the signals on the $\overline{1}$, $\overline{5}$, $\overline{7}$, and $\overline{9}$ lines.

Means are provided for setting the error flip-flop whenever a digit selected by the operator falls outside of the allowable selection range. It will be recalled that the circuit shown in FIG. 1B produces an overflow signal on line 159 whenever certain digit combinations beyond the allowable selection range are attempted. During the loading sequence, both the $\overline{\text{delay}}$ signal and the Q1+Q2 signal are at logic level 1. Therefore, any such prohibited combination which triggers an overflow signal will also cause the output of NAND circuit 560 to fall to 0, thereby triggering an error signal from NAND circuit 554. Circuit 556, which goes to 0, drives the error indicator lamp 566. This lamp is made to flash on and off periodically by applying the error signal to NAND circuit 389 (FIG. 4A), where it gates the clock signal into the A counter 320. The 256A signal will then change state every 256 counts, which signal, when applied to NOR circuit 562, causes the lamp to flash on and off in the manner described. The operator may now actuate a reset switch S10, shown in FIG. 1A, causing a reset signal to be generated in the manner previously described. The error signal on line 558 produces a 0 at the output of inverter 402 (FIG. 4A), which output produces a 1 from NAND circuit 400, thereby automatically resetting Q flip-flops FF4 and FF5. Also while the error signal exists, a 0 will be transmitted from inverter 196 (FIG. 2), inhibiting further operation of the load pulse generating circuit until the error signal is reset. The reset signal applied to NAND circuit 556 resets NAND circuits 558 and 556 to 0 and 1, respectively, thereby resetting the error signal and extinguishing the error indicator light 566.

Means are also provided for setting the error flip-flop if a "premium" key, as determined by the setting of the premium pricing switches P1–P9, is used to select the second digit of a selection numeral while only standard credit remains. If such a key is used to select a second digit and no premium credit remains, all of the inputs to NAND circuit 536 will become positive when a load second digit signal is generated on line 50, producing a 0 output from NAND circuit 536 and producing an error signal in the manner just described. Resetting is also accomplished in a similar fashion. If the operator changes his mind or presses the wrong button, he may also restart the select sequence in the absence of an error signal by depressing the reset button S10 at any time before the third digit has been selected.

Means are also provided for setting the error flip-flop if a digit selected by the operator falls within the allowable selection range, but nevertheless does not correspond to a key which was actuated. Thus, if two or more selection keys are simultaneously actuated when selecting a digit, the shift register 44–52 will be loaded with a signal which is the logical sum of the signals which would have been loaded if the keys were actuated individually. With the coding system employed herein, the digit which will be loaded as a result will equal or exceed that of the highest-numbered key simultaneously actuated. If the number loaded exceeds the number of the highest-numbered key, but does not equal or exceed ten and thereby produce an overflow signal on line 156, a 1 will be produced at the output of NAND circuit 528. When the $\overline{\text{M=1}}$ signal on line 245 drops to 0 to strobe a load digit pulse, inverter 530 also produces a 1. As a result, NAND circuit 532 produces a 0 pulse, setting the error flip-flop and producing an error signal in the manner described. By these means, the operator is prevented from loading, by the simultaneous actuation of two or more keys, a digit which does not correspond to any of the keys actuated, but which would not otherwise be prohibited.

FIGS. 7, 8A, and 8B illustrate the timing relationships which exist between the various data and control signals. Reference will be made to these drawings in recapitulating the operation of the selector system. We begin with the selector system in a playing mode and with selection 174 being played. As a result of a previous incoming pulse train, shift register sections 44 and 52 are loaded with data representing the numeral 174. Incomng clock pulses on line 342 cause delayed pulses to be generated on lines 322 and 62, which pulses respectively advance the A counter 320 and shift incoming data pulses on line 348 into the shift register. When the A counter has reached 10, and line 342 thereafter becomes quiescent, a pulse is generated on line 70 which is fed to the clock input of latch 68. This pulse, which vanishes when the A counter is reset, loads the newly entered shift register contents into the latch for display purposes.

As a result of a previous incoming pulse train, the latch 68 has 1's initially stored in both the 100's and the 200's output places. These signals are applied to circuit 284 of the display control circuit shown in FIG. 3, causing pulse trains CP1-CP3 to be activated. This in turn enables all three display lamps and results in the display of the latch contents 174. Since the latch contents remain unchanged after the first incoming pulse train, the display circuit is also unaffected.

Approximately 10 clock periods after the end of the first incoming pulse train shown, a second pulse train follows. Shortly after this second pulse train starts, in this particular example, standard credit happens to become available, as indicated by the standard credit signal on line 82. With this signal, the system will be placed in a selecting mode upon the first actuation of a selector key. For the time being, however, the system continues in a "playing" mode in which the number of the selection being played is displayed. Thus, the shift register 44–52 is loaded and the latch 68 updated a second time in a manner identical to that of the first.

Referring now to FIG. 8A, the system is placed in a selecting mode when the first digit two of the desired selection number 256 is chosen. When the key corresponding to the digit two is actuated, the AKP signal generated on line 174 sets the start strobe flip-flop FF1, thereby actuating the load pulse circuit shown in FIG. 2. Because the shift register 44–52 is partially loaded with data representing the selection being played, a pulse is generated on line 59, clearing the shift register. Immediately thereafter, a load first digit pulse on line 59 loads the first digit portion of the shift register with data representing the digit two. When the Q counter is indexed to one, a Q1 + Q2 signal is applied to the latch control circuit shown in FIG. 5, which circuit then produces a latch clock signal on line 70, loading the latch with the contents of the shift register, or the digit two. At the same time, a $\overline{Q1}$ signal of 0 is applied to the display control circuit of FIG. 3 so that CP1 pulses will continue to be generated and the contents of the first digit portions of the latch 68 will continue to be displayed. Because dissimilar bits have now been loaded into the 100's and 200's place outputs of the latch 68, pulses CP1 and CP2 are extinguished, thus blanking the second and third digit portions of the digital display. Approximately 60 clock periods after the first key is released, the start strobe flip-flop is reset, allowing a second digit to be selected.

When a second key is pressed to select the digit five, the AKP signal on line 174 causes to be produced a start strobe signal and, almost immediately thereafter, a load second digit pulse, which pulse loads the second digit portion of the shift register with data representing the digit five. After the load digit pulse, a Q2 signal is applied to the display control circuit, activating pulses CP1 and CP2. As a result, both the digit two and the digit five are displayed. 60 clock periods after the second key is released, the start strobe flip-flop is again reset, allowing the selection of a third digit.

When a third key is pressed to select the digit six, the AKP signal again turns on the start strobe signal, and, almost immediately thereafter, a load third digit pulse, which pulse loads the third digit portion of the shift register with data representing the digit six. After the load digit pulse has indexed the Q counter, Q2 and selection loaded signals are applied to the display control circuit, activating pulse trains CP1, CP2, and CP3. As a result, the entire three digit number 256 is displayed.

The selection loaded signal is applied along with the 8A output of the A counter 320 (which continues to be clocked by the incoming $\overline{\text{line clock}}$ signal) to the flip-flop comprising NAND circuits 355d and 355e. NAND circuit 355d is set as soon as the A counter reaches a count of eight. This places the send flip-flop comprising circuits 358 and 366 in condition to be set.

Referring now to FIG. 8B, the counter A counter 320 is cleared on the second leading edge of the clock signal when the B counter 454 has reached a count of three. The send flip-flop is set a half a clock period later when the $\overline{\text{clock}}$ line 270 goes positive.

The send signal generated on line 375 turns on the $\overline{\text{count}}$ signal, which clocks the A counter 320, and also turns on the delay signal on the first negative-going level change on the $\overline{\text{count}}$ line. During the coincidence of the send and delay signals, data previously loaded into the shift register is clocked out by pulses on line 62 onto $\overline{\text{line data}}$ line 348. The shifting pulses themselves appear on $\overline{\text{line clock}}$ line 342. Lines 342 and 348 return to their quiesecent state when the send signal is turned off nine and one half clock periods after the onset of the delay signal.

A cancel signal, which is fed to the credit accumulator in order to substract the proper amount of credit, begins when A (the count reached by the A counter) reaches 1 and ends when A reaches 64. When A reaches 64 there is generated a reset Q flip-flops signal on line 262, which signal resets the Q counter portion of the circuit shown in FIG. 2 in preparation for the next selection sequence. This also resets the selection loaded signal on line 190, which in turn resets NAND circuit 355d.

The $\overline{\text{delay}}$ signal generated by the transmitting section is conveyed to the latch control circuit shown in FIG. 5, where it is used to turn off the latch clock on line 70. As a result, the latch 68 stores, for the duration of the transmitting cycle, the data existing in the shift register at the beginning of that sequence, but which has now been sent to the storage unit. The delay signal on line 381 is ANDed with an A<6144 signal and applied to the display control circuit of FIG. 3, where it is used to sustain pulses CP1-CP3 for a portion of the transmitting cycle. By this means, data loaded into the shift register is displayed for a predetermined period of time following the completion of a selection.

When the A counter reaches 6144, the delay·A<6144 signal turns off, thereby blanking the display for the remainder of the time spent in the selection mode — a period comprising 1024 clock periods, or about three quarters of a second. The delay signal is reset when the A counter reaches a count of 7168. This in turn disables the $\overline{\text{count}}$ signal on line 322, causing the A counter to reset if approximately two clock periods pass without clocking. With the delay signal gone, the A counter is again clocked by the signal on line 342. In the example shown in FIG. 8B, the A counter does not have time to reset, as an incoming pulse train on the $\overline{\text{line clock}}$ line 342 produces pulses on the $\overline{\text{count}}$ line 322 very shortly after the 7168th count. When ten such pulses have been received, and applied to the A counter, the signal on line 70 loads the latch 68 with the contents of the shift register 174 (in this example the same record is still being played). The 100's place and 200's place latch outputs, now identical, are applied to the display control circuit shown in FIG. 3, enabling pulse trains CP1, CP2, and CP3 and thereby restoring the display of the latch contents. The 100's place and 200's place latch outputs applied to the display control circuit also actuate the playing lamp 289. The system is now in a "playing" mode, as it was during the period illustrated in FIG. 7. If there still remains standard credit, the system may be returned to the selecting mode by the further actuation of selection keys.

It will be seen that I have accomplished the objects of my invention. My selector requires only ten push buttons for proper operation. It does not require the multiplicity of electro-mechanical devices employed in systems of the prior art. It visually displays the number of a selection as it is made and of a selection as it is played. My selector does not require a multiplicity of transmission lines. It is compact, and is simple and certain in operation.

It will be understood that certain features and subcombinations are of utility and may be employed without reference to other features and subcombinations. It will be further obvious that various changes in detail may be made without departing from the invention.

Having thus described my invention, what I claim is:

1. In an automatic phonograph adapted to play a multiplicity of selections identified by respective multi-digit numbers and having credit registering means which produces a credit signal indicating the existence of a credit equalling at least the price of a play, apparatus for visibly displaying the number of a selection including, a number of digital display devices corresponding to the number of digits in a selection identification number, each of said display devices comprising a plurality of segments adapted to be selectively illuminated to represent various digits, a plurality of manually operable switches corresponding respectively to the digits adapted to make up a selection indentification number, and means responsive to said credit signal and to operation of a number of said switches corresponding to the number of digits in an identification number for selectively illuminating the segments of said devices to cause said devices respectively to visibly display the digits making up a selected number.

2. Apparatus as in claim 1 including means for inhibiting said illuminating means when the first digit selected is other than one of two predetermined digits.

3. Apparatus as in claim 1 in which said illuminating means comprises means responsive to actuation of one of said switches for producing a binary coded decimal representation of the digit corresponding to the actuated switch.

4. Apparatus as in claim 1 including means for maintaining the illumination of said segments for a predetermined time after actuation of a number of said switches making up an identification number.

5. Apparatus as in claim 4 in which said predetermined time is a first predetermined time, said apparatus including means for inhibiting illumination of said segments for a second predetermined time after said first predetermined time.

6. In an automatic phonograph having a playing unit adapted selectively to play a multiplicity of selections identified by multiple-digit numbers in response to input signals representing said numbers and to produce an output signal representing a selection presently being played, said input signals being of the same character, and having credit registering means which produces a credit signal indicating the existence of a credit at least equal to the price of a play, apparatus for visibly displaying the number of a selection including a plurality of display devices corresponding to the number of digits in a selection identification number, each of said devices adapted to be actuated to display various digits, a plurality of manually operable switches adapted to be actuated to provide a multiple digit selection signal, means normally coupling said playing unit output signal to said display devices to display the number of a selection being played.

and means responsive to said credit signal and to actuation of a number of said switches corresponding to the number of digits in a selection identification number for deactivating said output signal coupling means and for coupling said selection signal to said display device to display the number of a selection to be played.

7. Apparatus as in claim 6 in which said deactivating and coupling means deactivates the output signal coupling means upon actuation of one of said switches.

8. Apparatus as in claim 6 including means for inhibiting said deactivating and coupling means when any of the digits selected is not within a predetermined class of digits reserved for that particular place in the selection identification number.

9. Apparatus as in claim 6 including means for inhibiting said deactivating and coupling means when the first digit selected is other than one of two predetermined digits.

10. Apparatus as in claim 6 including means responsive to the simultaneous actuation of predetermined combinations of said manually operable switches for inhibiting the deactivating and coupling means.

11. Apparatus as in claim 6 in which said credit registering means also produces a second credit signal indicating the existence of a predetermined amount of credit equal to the price of a premium selection, said apparatus including means responsive to the absence of said second credit signal for inhibiting said deactivating and coupling means whenever any of the digits selected is not within a predetermined class of digits reserved for that particular place in the selection identification number.

12. Apparatus as in claim 11 in which said inhibiting means inhibits the deactivating and coupling means whenever the second digit selected is not within a predetermined class of digits.

13. In an automatic phonograph having a playing unit adapted selectively to play a multiplicity of selections identified by multiple-digit numbers in response to transmitted selection signals representing said numbers, said selection signals being made up of a plurality of digit signals corresponding to the number of digits in a selection identification number, and having credit registering means which produces a credit signal indicating the existence of a credit at least equal to the price of a play, apparatus for selection and display of the number of a selection including a register having a plurality of sections corresponding to the number of digits in a selection identification number, and which is capable of storing a signal representing said selection identification number, a plurality of display devices corresponding to the number of digits in a selection identification number, decoding means coupling the register to said display devices to display the number stored in said register, a plurality of manually operable switches corresponding to the digits forming the selection identification number, means responsive to the actuation of one of said switches for generating a digit signal comprising a binary representation of the corresponding digit and for loading said digit signal into the register, means responsive to the absence of a credit signal for inhibiting said generating and loading means, means responsive to the loading of a sufficient number of digit signals into the register by said generating and loading means to form a selection signal for transmitting said signal to the playing unit.

14. Apparatus as in claim 13 in which said selection signal comprises a binary coded decimal representation of the selection identification number, and in which said register is a shift register capable of storing said selection signal.

15. Apparatus as in claim 14, in which said transmitting means includes transmission channels leading from said register to said playing unit, and in which said selection signal is transmitted as a serial train of pulses over a signal one of said transmission channels.

16. Apparatus as in claim 15, in which said transmitting means includes means for generating a train of clock pulses in synchronization with the pulses forming said selection signal, and for transmitting said train of clock pulses to the playing unit over a second transmission channel.

17. Apparatus as in claim 13 in which each of said switches corresponds to a different digit, and in which the selection signal which is loaded in response to the actuation of said switches is determined by the order in which said switches are actuated.

18. Apparatus as in claim 17 including means responsive to the simultaneous actuation of predetermined combinations of said manually operable switches for disabling the generating and loading means.

19. Apparatus as in claim 17 including means responsive to the actuation of any one of said switches for inhibiting the responsiveness of the generating and loading means to subsequent switch actuation for a predetermined time thereafter.

20. Apparatus as in claim 13, including means, responsive to the loading of a digit into the shift register by said generating and loading means, for enabling the display device corresponding to said digit.

21. Apparatus as in claim 13, including means for enabling said display devices for a predetermined period of time following the loading of the selection signal into the register, and for disabling said devices thereafter.

22. Apparatus as in claim 13, in which said decoding means includes a latch coupling the register to the display devices, and in which said transmitting means, in response to the loading of the register by said generating and loading means with a selection signal, first disables said latch and then transmits the contents of the register.

23. Apparatus as in claim 13 including means responsive to the loading of the register by the generating and loading means with a selection signal for disabling said generating and loading means.

24. Apparatus as in claim 23 in which said disabling means disables said generating and loading means for a predetermined time following the transmission of the selection signal from the register by said transmitting means.

25. In an automatic phonograph having a playing unit adapted selectively to play a multiplicity of selections identified by multiple digit numbers in response to selection signals representing said numbers and to produce a playing signal representing a selection presently being played, said selection and playing signals each comprising binary coded decimal representations of selection identification numbers, and having credit registering means which produces a credit signal indicating the existence of a credit at least equal the price of a play, apparatus for selection and display of the number of a selection including a shift register having a plurality of serially connected sections corresponding to the number of places in a selection identification number, each of said sections adapted to store the representation of one digit forming said number, a plurality of display devices corresponding to the number of digits in a selection identification number, decoding means coupling the register sections to the respective display devices to display the number stored in said sections, a plurality of manually operable switches corresponding to the respective digits, means responsive to the actuation of one of said switches for generating a digit signal comprising a binary coded representation of the corresponding digit and for loading said digit signal into the shift register, means normally coupling said playing signal to said register to store the number of the selection being played, means responsive to said credit signal for deactivating said playing signal coupling means, means responsive to the absence of a credit signal for inhibiting said generating and loading means, means responsive to the loading of digit signals into all of the shift register sections for shifting said signal out of said register and for transmitting the same to the playing unit.

26. Apparatus as in claim 25 including means for inhibiting said deactivating means prior to the first actuation of said switches.

27. Apparatus as in claim 26 in which said deactivating means operates for a predetermined time following the transmission of the representation from the shift register.

28. Apparatus as in claim 25 in which said playing signal is received periodically from said playing unit, and in which said playing signal coupling means is responsive to each signal received.

29. Apparatus as in claim 25 in which said decoding means includes a latching register capable of storing the signal in the shift register, and means coupling the latching register to the display devices to display the number stored therein.

30. Apparatus as in claim 25, including means for disabling said latching register whenever a playing signal is being loaded by said playing signal coupling means into the shift register.

31. Apparatus as in claim 30, including means responsive to the absence of a playing signal for a predetermined period of time for inhibiting said decoding means.

32. Apparatus as in claim 25 in which said transmitting means includes transmission channels leading from said shift register to said playing unit, and in which the selection signal and the playing signal are carried over the same transmission channels.

33. Apparatus as in claim 32 including means for delaying the operation of said transmitting means until a playing signal has been received from the playing unit and a predetermined time has elapsed thereafter.

34. Apparatus as in claim 33, in which said predetermined time is a first predetermined period of time, said apparatus including means responsive to the absence of a playing signal for a second predetermined period of time for inhibiting the delay of said transmitting means.

35. Apparatus as in claim 25, including means responsive to the presence of a signal on a transmission channel used by said transmitting means for delaying the operation of said transmitting means.

36. Apparatus as in claim 35 in which said delaying means also operates for a predetermined time following the presence of said signal.

* * * * *

UNITED STATES PATENT OFFICE

CERTIFICATE OF CORRECTION

Patent No. 3,891,970 Dated June 24, 1975

Inventor(s) William C. Brotz

It is certified that error appears in the above-identified patent and that said Letters Patent are hereby corrected as shown below:

Column 29, line 53, after "input" insert

-- and output --;

Column 31, line 14, "signal" should read

-- single --.

Signed and Sealed this

*ninth* Day of *September 1975*

[SEAL]

*Attest:*

RUTH C. MASON
*Attesting Officer*

C. MARSHALL DANN
*Commissioner of Patents and Trademarks*